(12) United States Patent
Yu et al.

(10) Patent No.: US 7,832,141 B2
(45) Date of Patent: Nov. 16, 2010

(54) FLOWER SUPPORTING DEVICE

(75) Inventors: Young-Sil Yu, 108-1503, Dogok Samsung Remian apt., Dogok 2-Dong, Kangnam-Ku, Seoul (KR) 135-537; Byung-Soo Yu, Seoul (KR)

(73) Assignee: Young-Sil Yu, Seoul (KR)

( * ) Notice: Subject to any disclaimer, the term of this patent is extended or adjusted under 35 U.S.C. 154(b) by 346 days.

(21) Appl. No.: 10/558,179

(22) PCT Filed: Jun. 25, 2004

(86) PCT No.: PCT/KR2004/001537

§ 371 (c)(1),
(2), (4) Date: Nov. 22, 2005

(87) PCT Pub. No.: WO2004/112551

PCT Pub. Date: Dec. 29, 2004

(65) Prior Publication Data

US 2006/0272204 A1    Dec. 7, 2006

(30) Foreign Application Priority Data

Jun. 26, 2003 (KR) .................. 10-2003-0042153
Jun. 26, 2003 (KR) .................. 10-2003-0042239
Jun. 26, 2003 (KR) .................. 10-2003-0042245
Feb. 28, 2004 (KR) ................ 20-2004-0005374 U

(51) Int. Cl.
*A01G 5/00* (2006.01)
*A47G 7/02* (2006.01)

(52) U.S. Cl. .................................. 47/41.12; 47/47

(58) Field of Classification Search ............ 47/41.01, 47/41.12, 41.13, 41.15, 44, 47, 58.1 CF; 63/38, 39, 1.16; 248/27.8; 428/23; 206/423; *A47G 7/02, A47G 7/03, 7/07, 7/00*
See application file for complete search history.

(56) References Cited

U.S. PATENT DOCUMENTS

| 1,927,038 | A | * | 9/1933 | Kane | 428/28 |
| 3,190,086 | A | * | 6/1965 | Klein | 66/193 |
| 3,418,194 | A | * | 12/1968 | Loftice | 206/423 |
| 3,698,132 | A | * | 10/1972 | Green et al. | 47/41.13 |
| 4,839,215 | A | * | 6/1989 | Starling et al. | 428/131 |

(Continued)

FOREIGN PATENT DOCUMENTS

JP       08-289832       11/1996

(Continued)

OTHER PUBLICATIONS

Water Absorbing Polymer Products [http://web.archive.org/web/*/http://www.yardener.com/WaterAbsorbingPolymerProducts.html, retrieved from Internet: Dec. 31, 2007] Jun. 21, 2004.*

(Continued)

*Primary Examiner*—Rob Swiatek
*Assistant Examiner*—Kristen C Hayes
(74) *Attorney, Agent, or Firm*—J.C. Patents

(57) ABSTRACT

A flower supporting device. A plurality of rotatable beads are connected by connection means having elasticity so that a support body is formed. A plurality of support bodies are arranged to be staggered up and down with each other so that a stem of a flower can be inserted between adjoining supporting bodies to be supported by them.

5 Claims, 26 Drawing Sheets

U.S. PATENT DOCUMENTS

| | | | | |
|---|---|---|---|---|
| 5,301,463 | A | * | 4/1994 | Domurat ................... 47/41.01 |
| 5,590,546 | A | * | 1/1997 | Hector .......................... 63/38 |
| 6,241,572 | B1 | * | 6/2001 | Braginsky ................... 446/85 |
| 6,991,141 | B2 | * | 1/2006 | Ciko et al. ................... 223/48 |
| 7,017,298 | B2 | * | 3/2006 | Yu ........................... 47/41.01 |
| 2003/0136150 | A1 | * | 7/2003 | Ciko et al. ..................... 63/38 |
| 2004/0134229 | A1 | * | 7/2004 | Oliver .......................... 63/37 |
| 2005/0005514 | A1 | | 1/2005 | Yu ........................... 47/41.12 |
| 2005/0166636 | A1 | * | 8/2005 | Lazor ........................... 63/38 |
| 2006/0117656 | A1 | * | 6/2006 | Graham et al. ............... 47/65.8 |

FOREIGN PATENT DOCUMENTS

| | | |
|---|---|---|
| JP | 10-014729 | 1/1998 |
| JP | 2003-135232 | 5/2003 |

OTHER PUBLICATIONS

Takako Translation, JPO, retrieved: Dec. 5, 2008.*
"Knot" definition from Webster's Online Dictionary; retrieved from internet: Apr. 21, 2009.*

* cited by examiner

[Fig. 1]
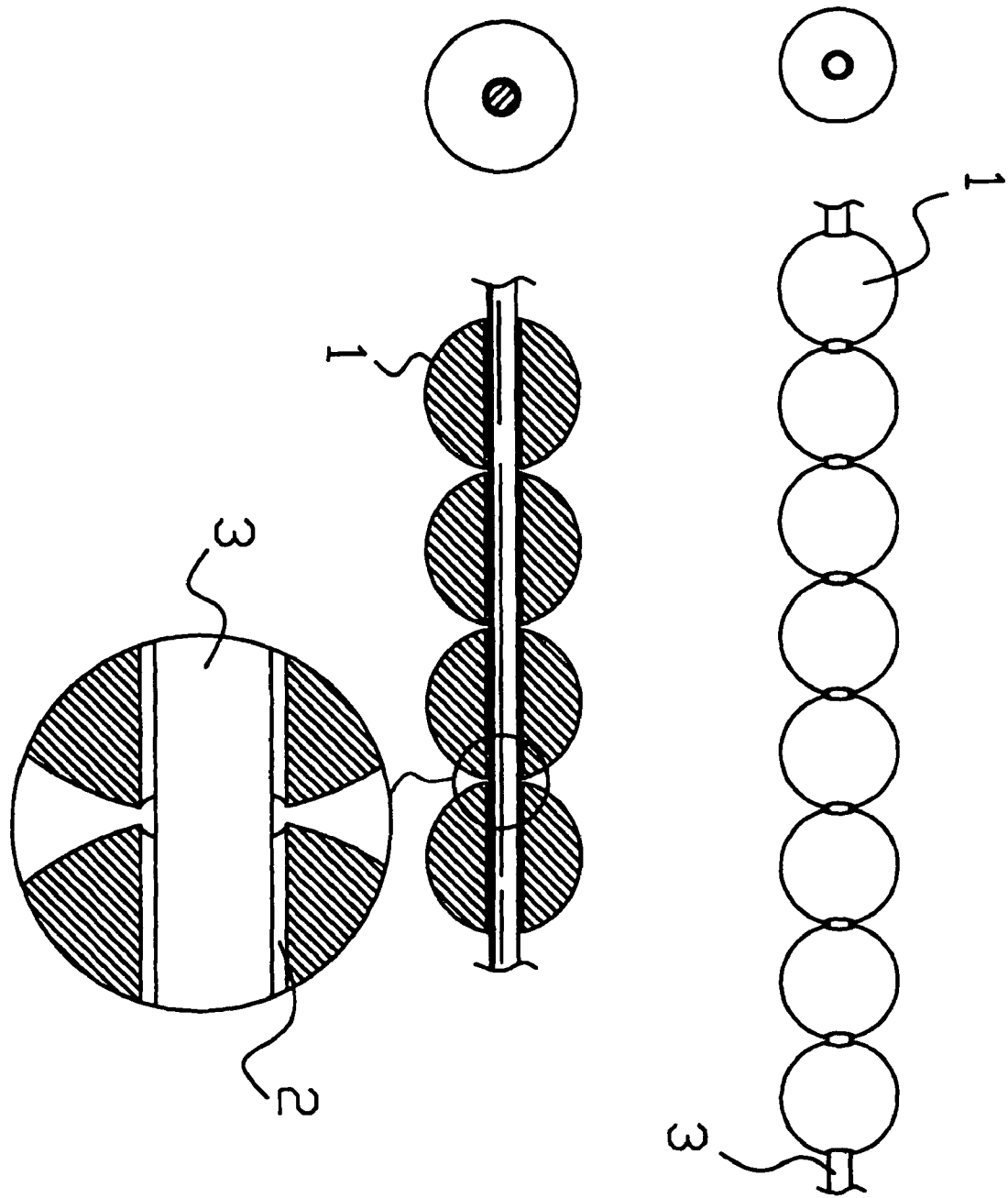

[Fig. 2]
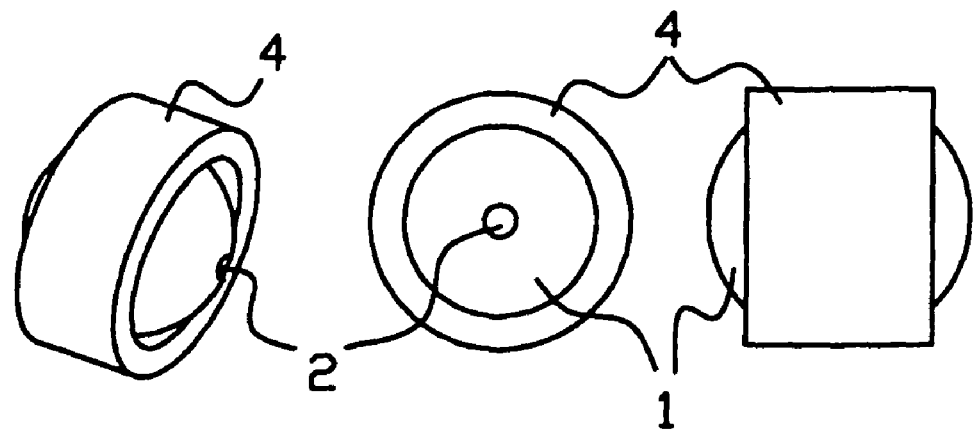
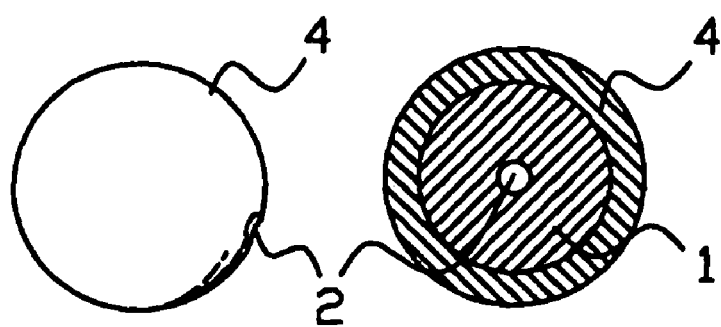
[Fig. 3]
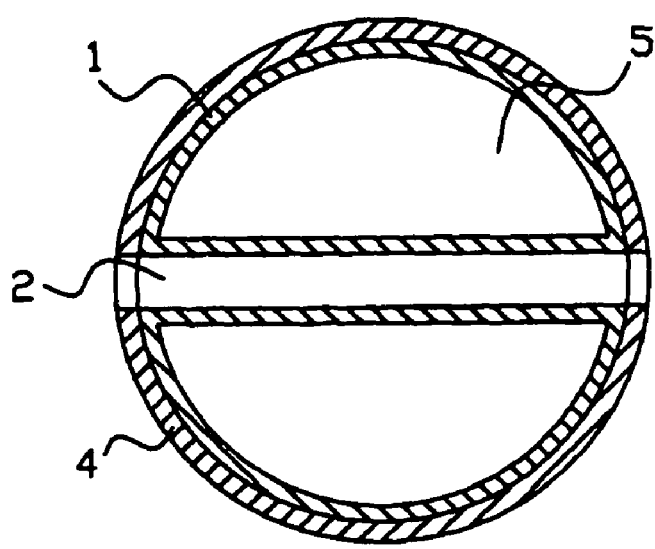

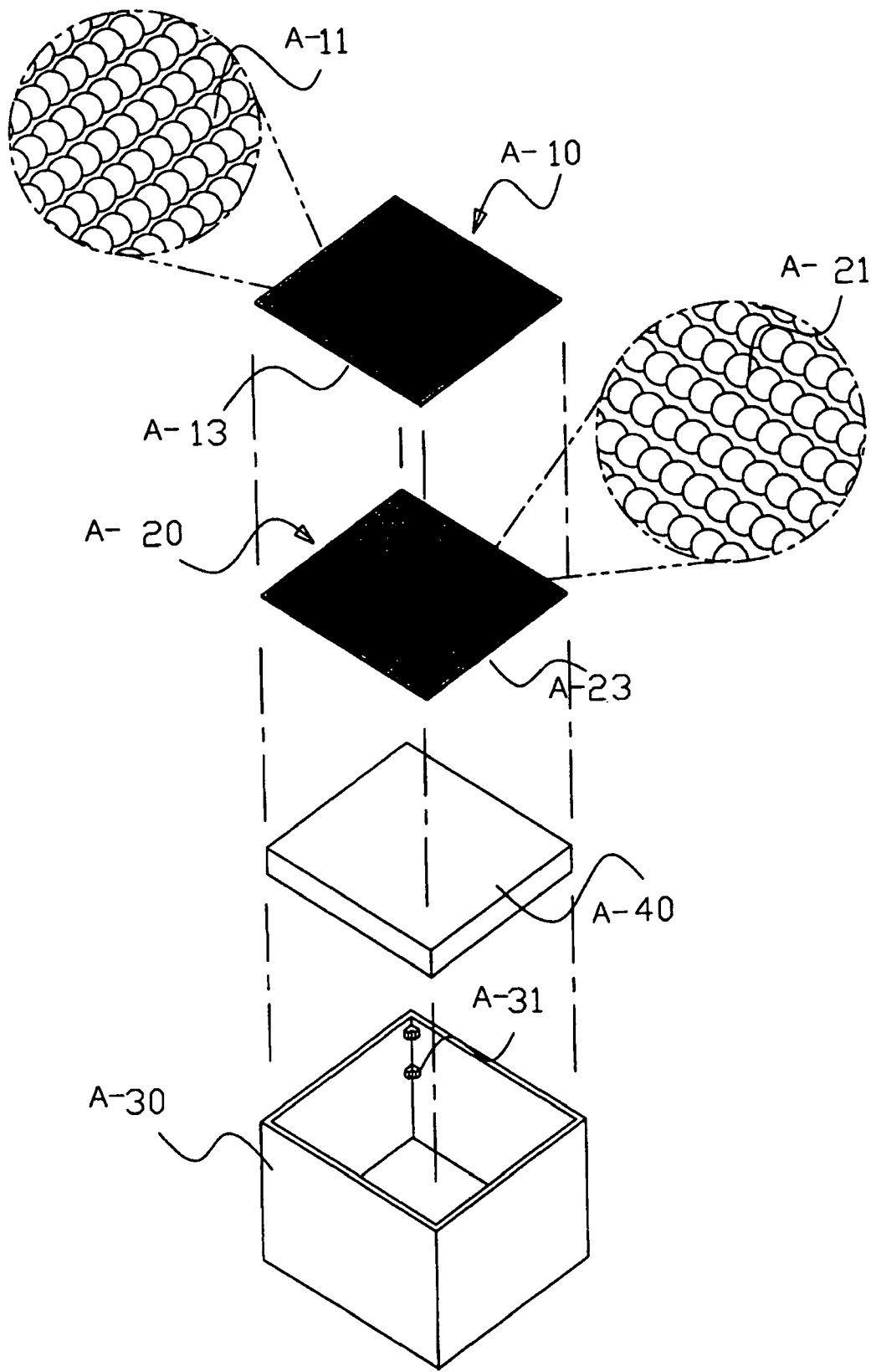
[Fig. 4]

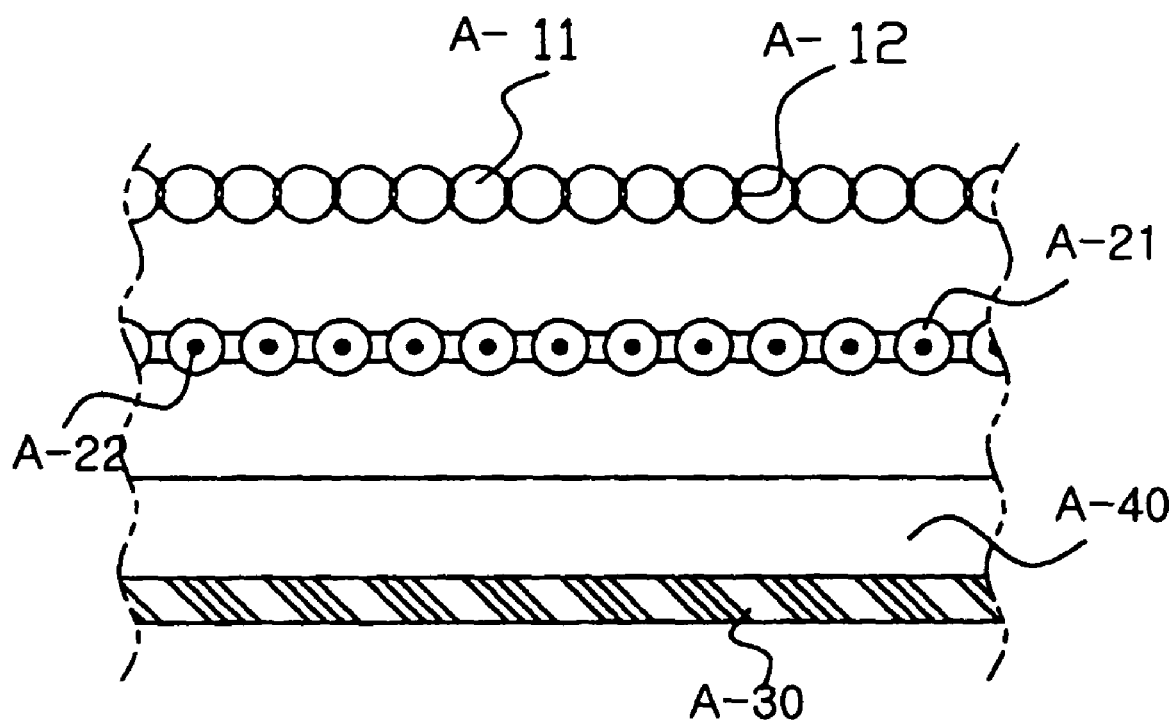
[Fig. 5]

[Fig. 6]
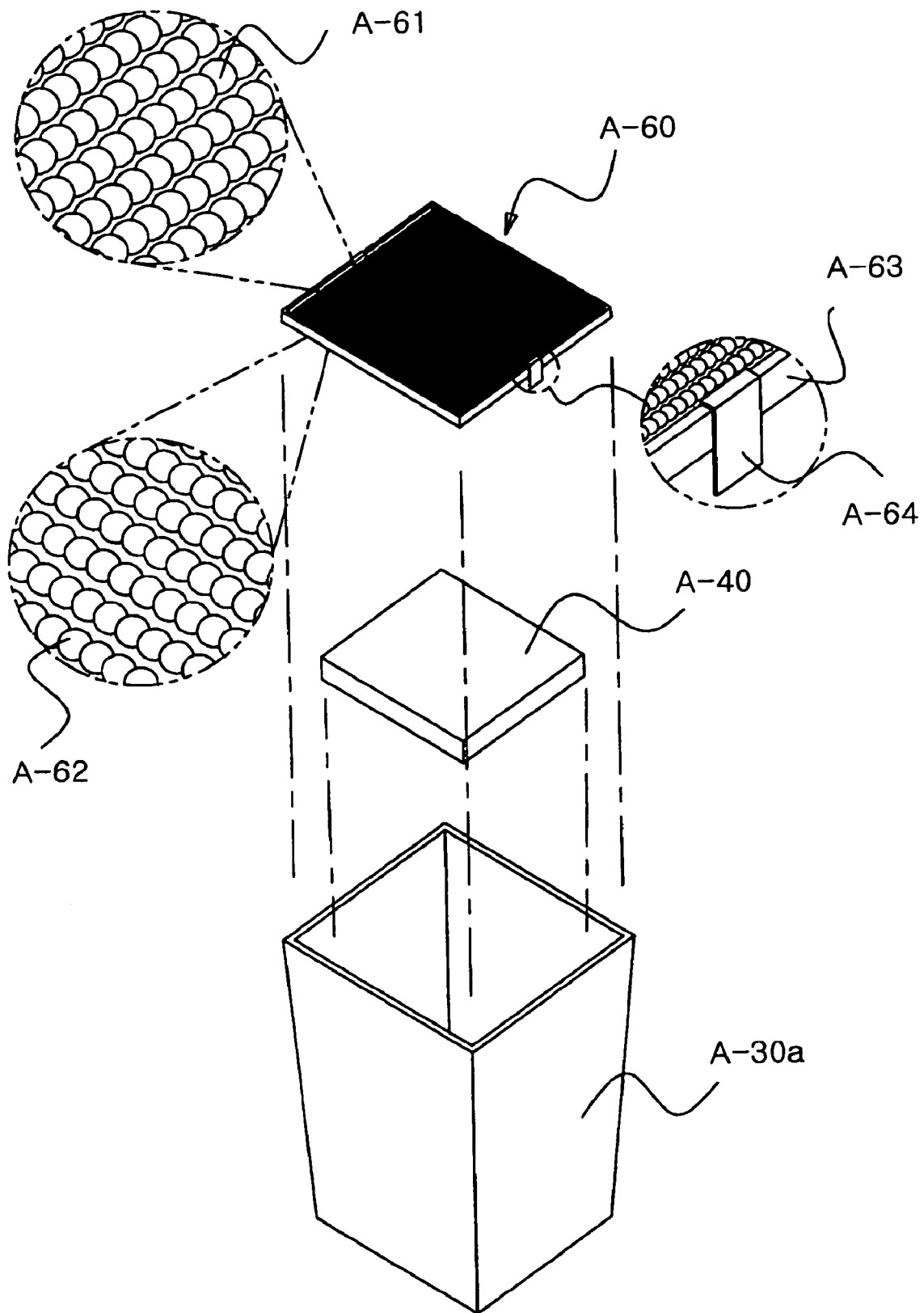

[Fig. 7]
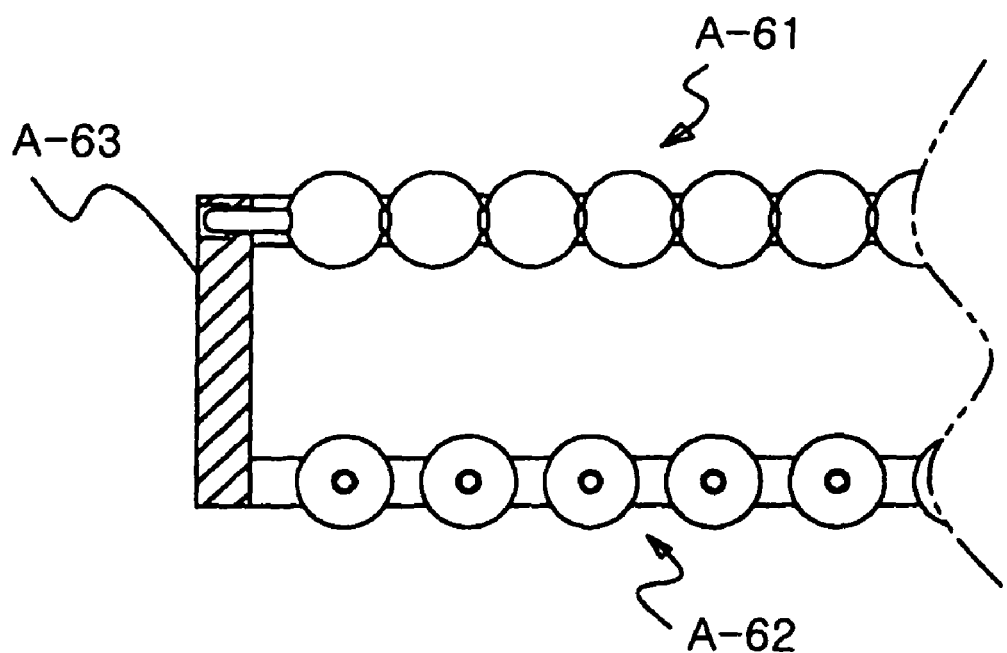
[Fig. 8]
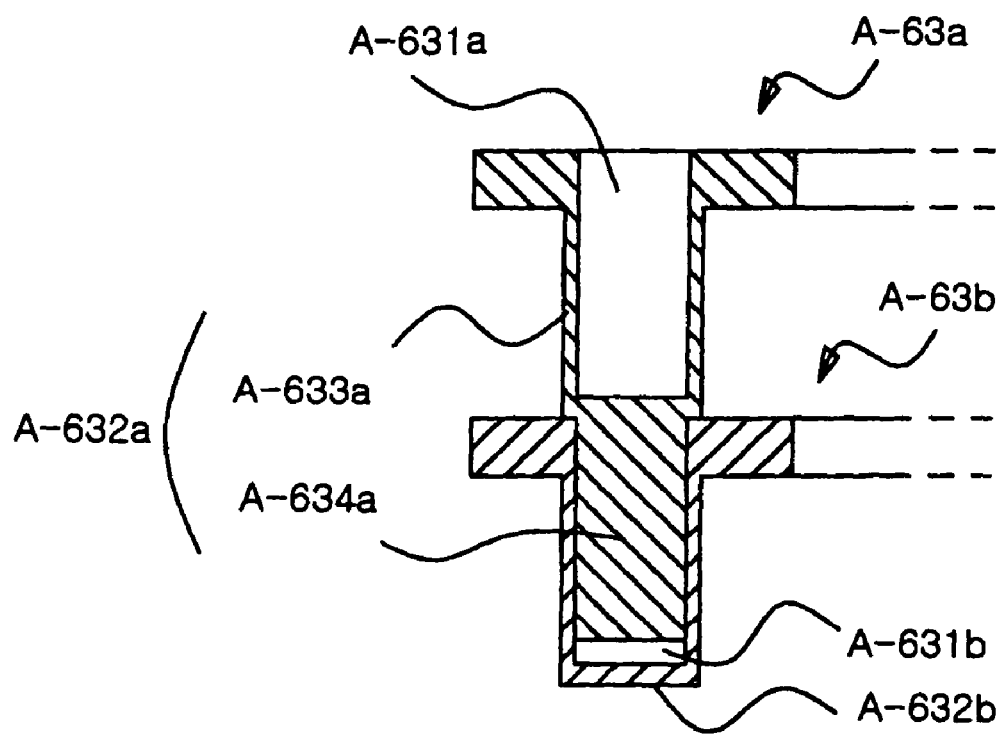

[Fig. 9]
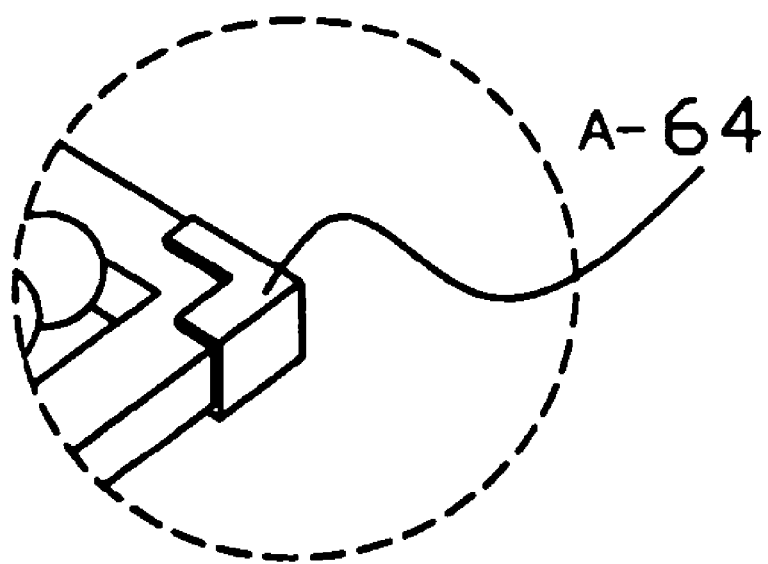

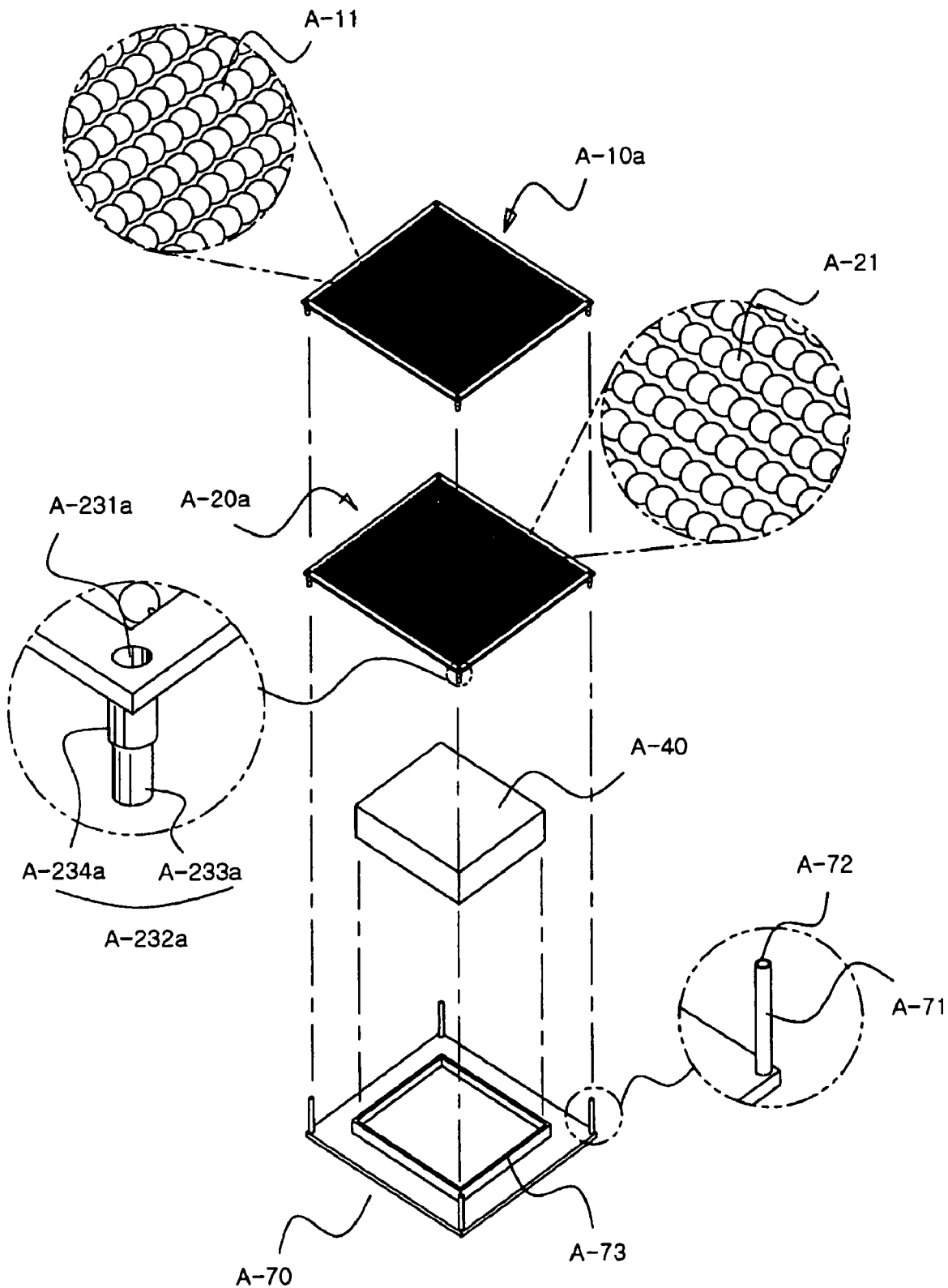
[Fig. 10]

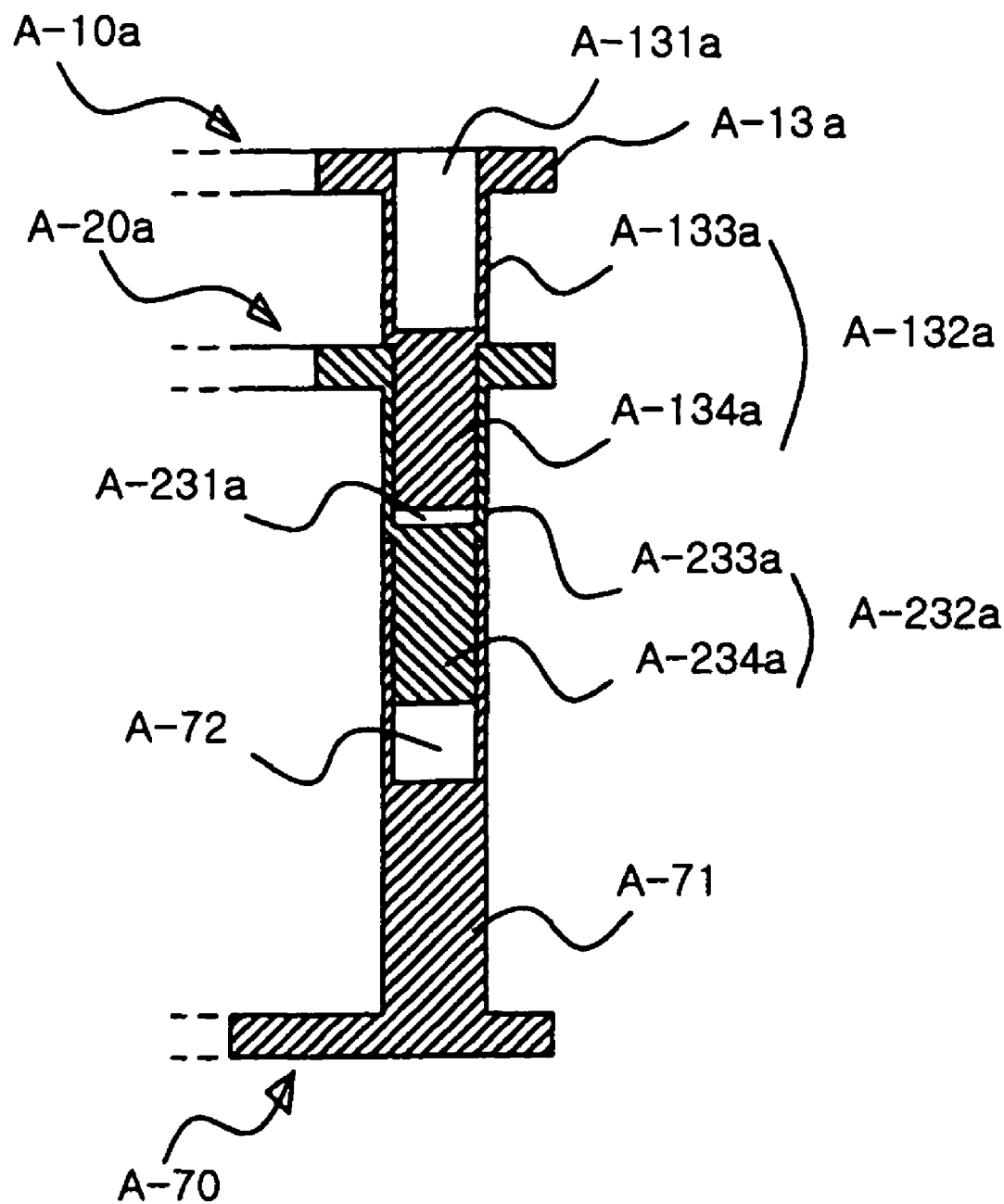
[Fig. 11]

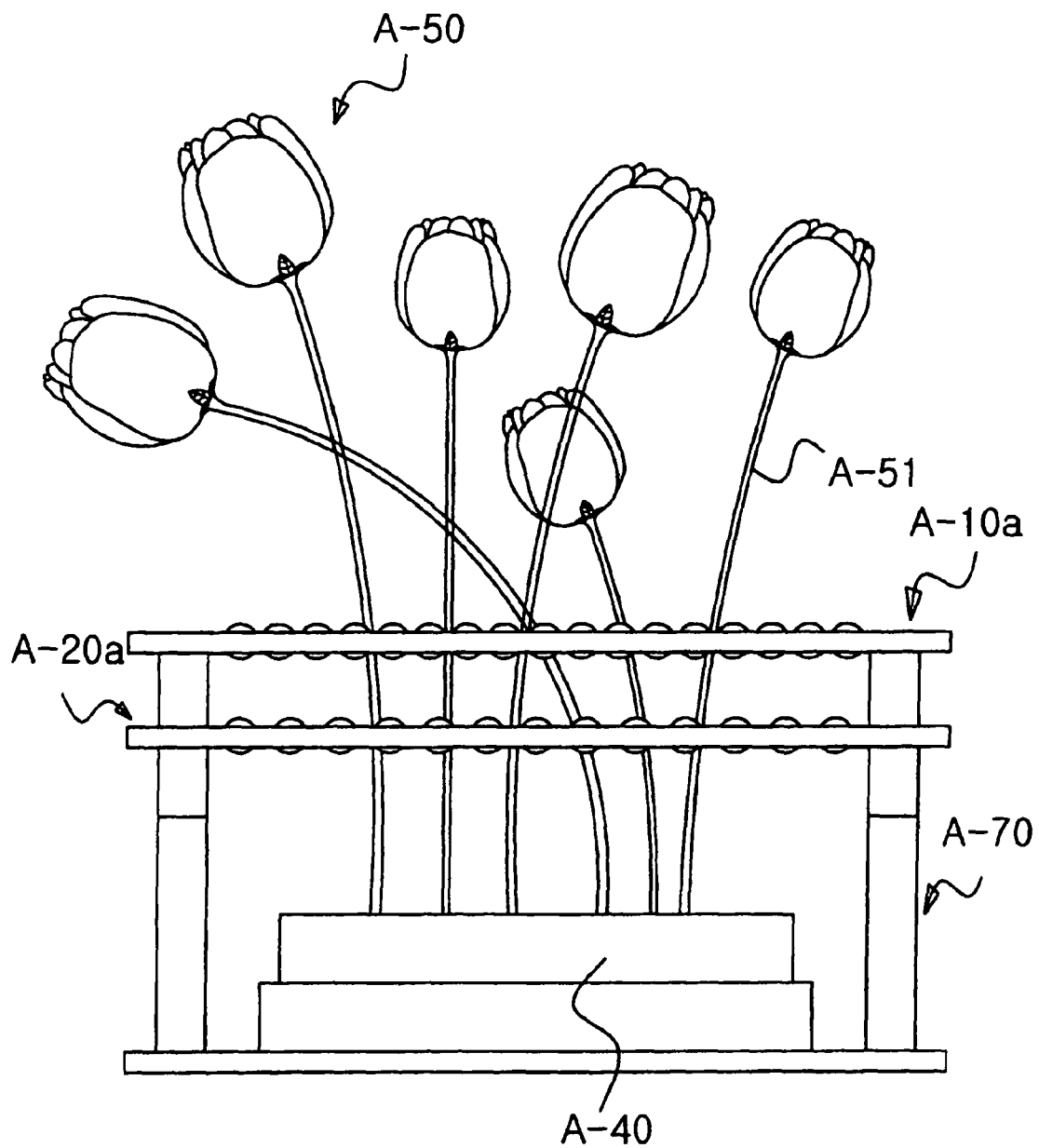
[Fig. 12]

[Fig. 13]
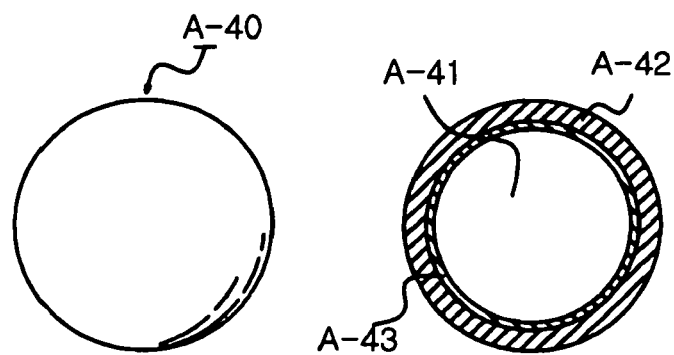
[Fig. 14]
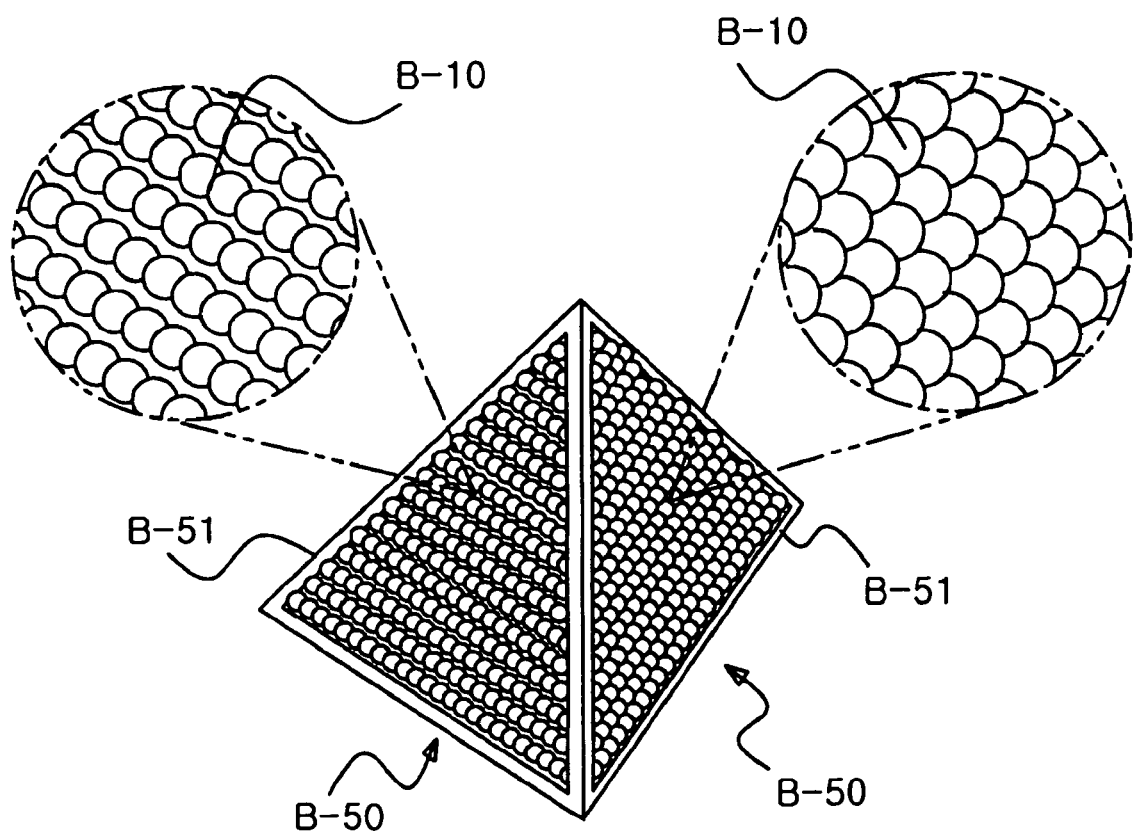

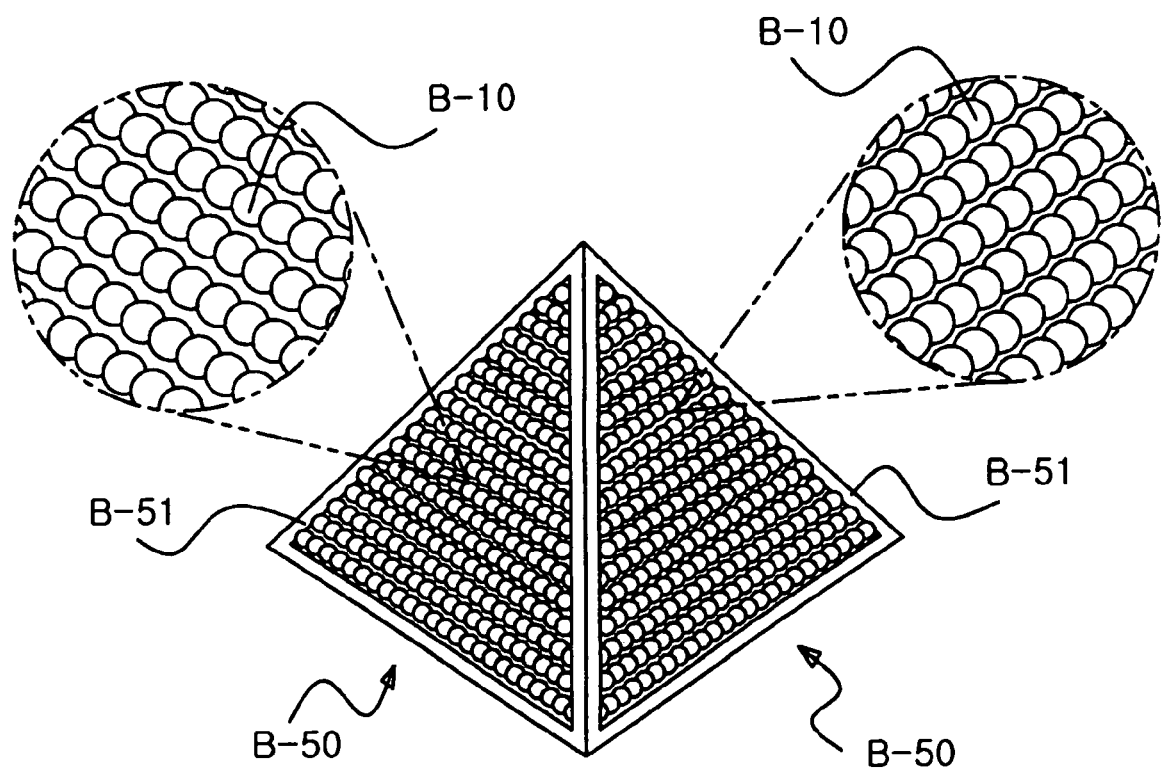
[Fig. 15]

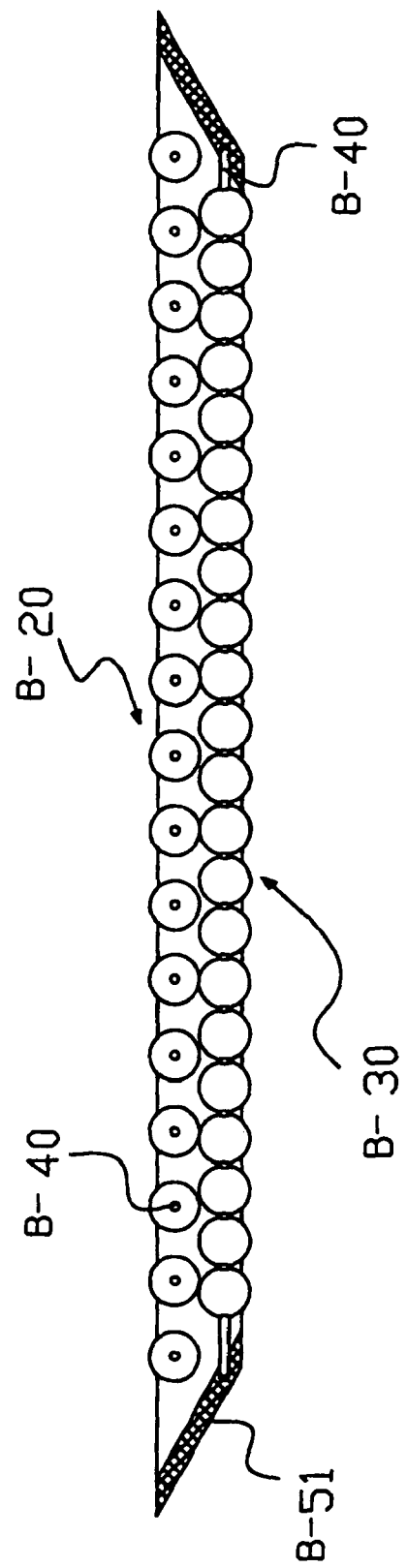
[Fig. 16]

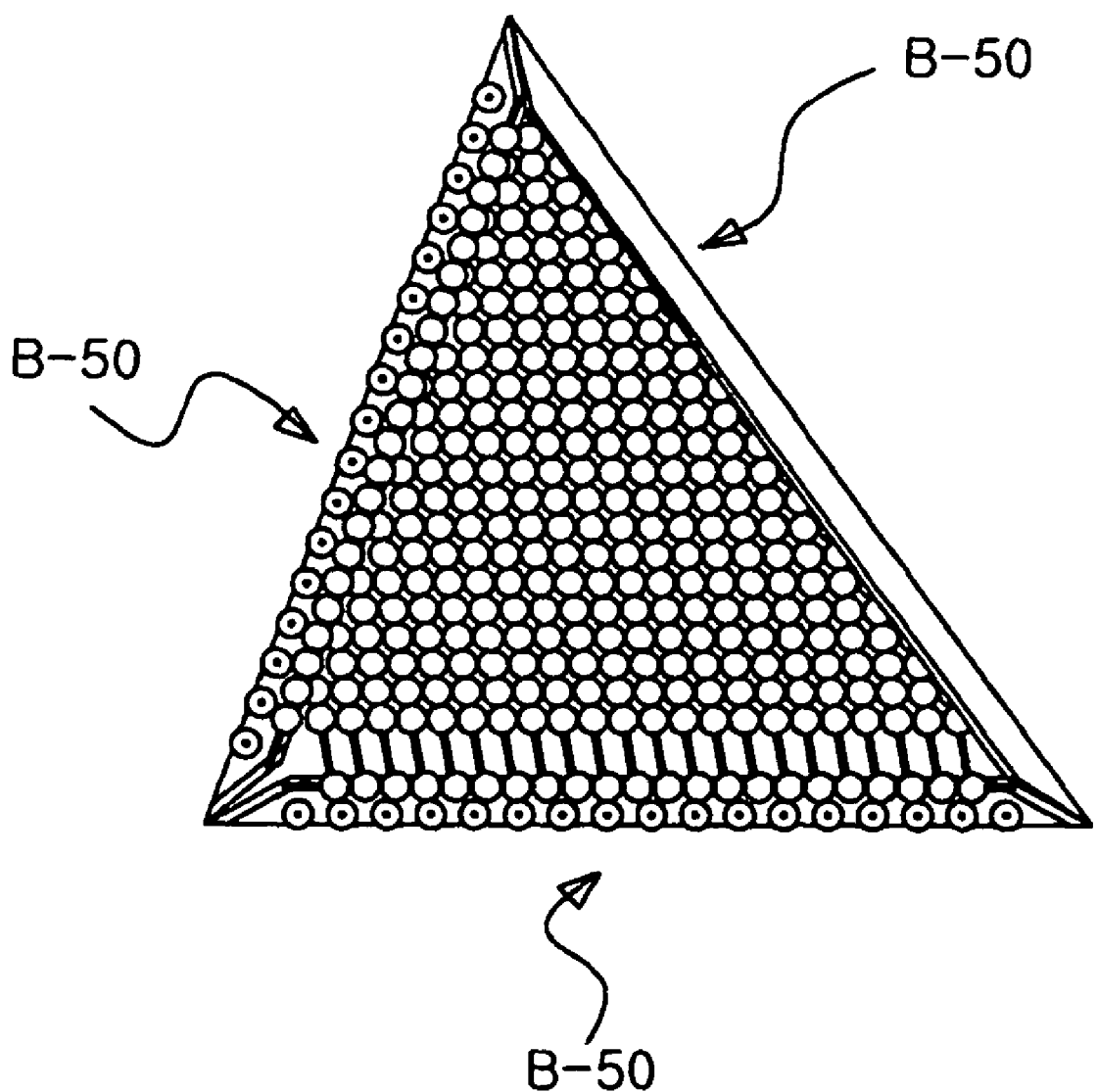
[Fig. 17]

[Fig. 18]
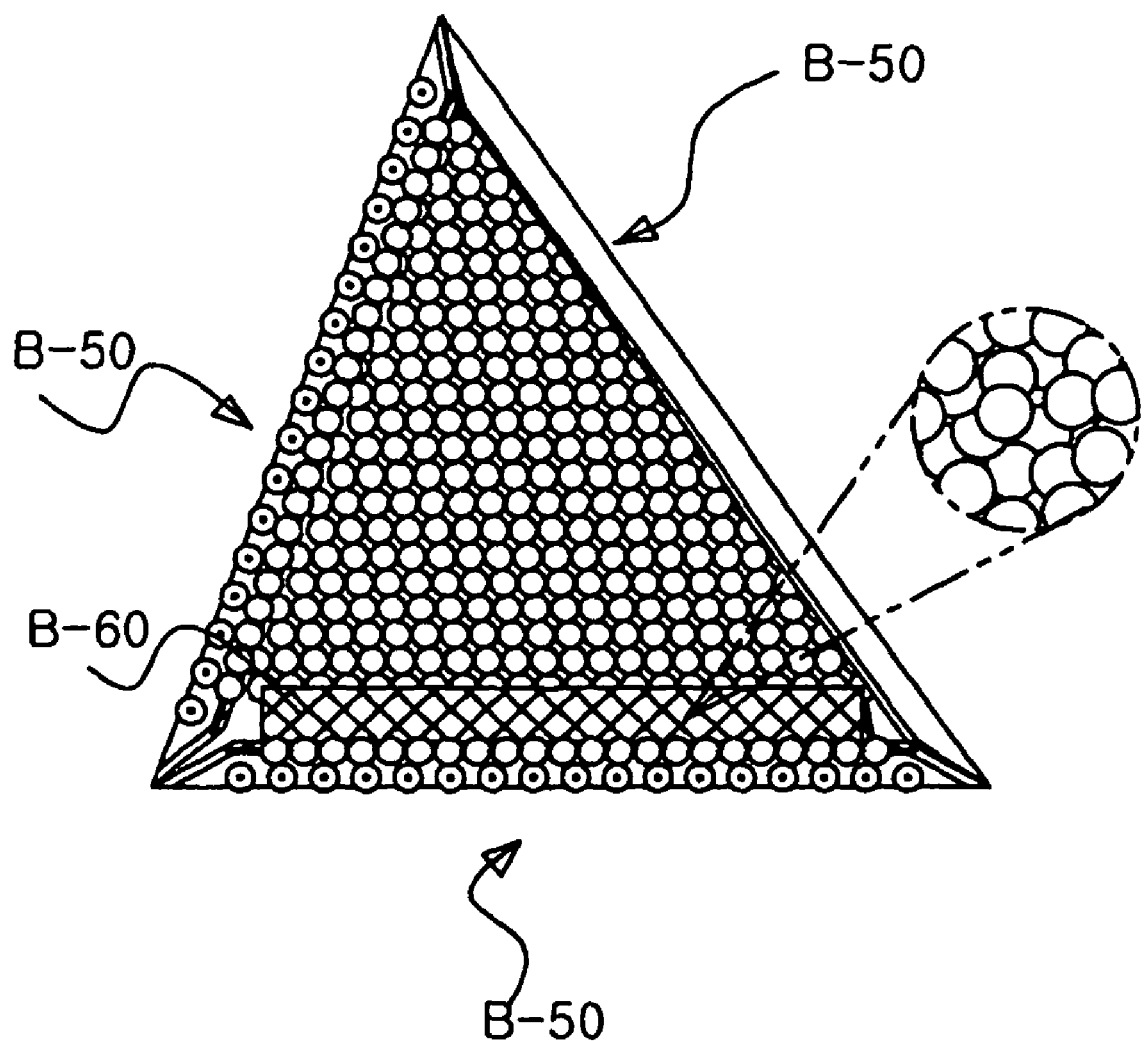

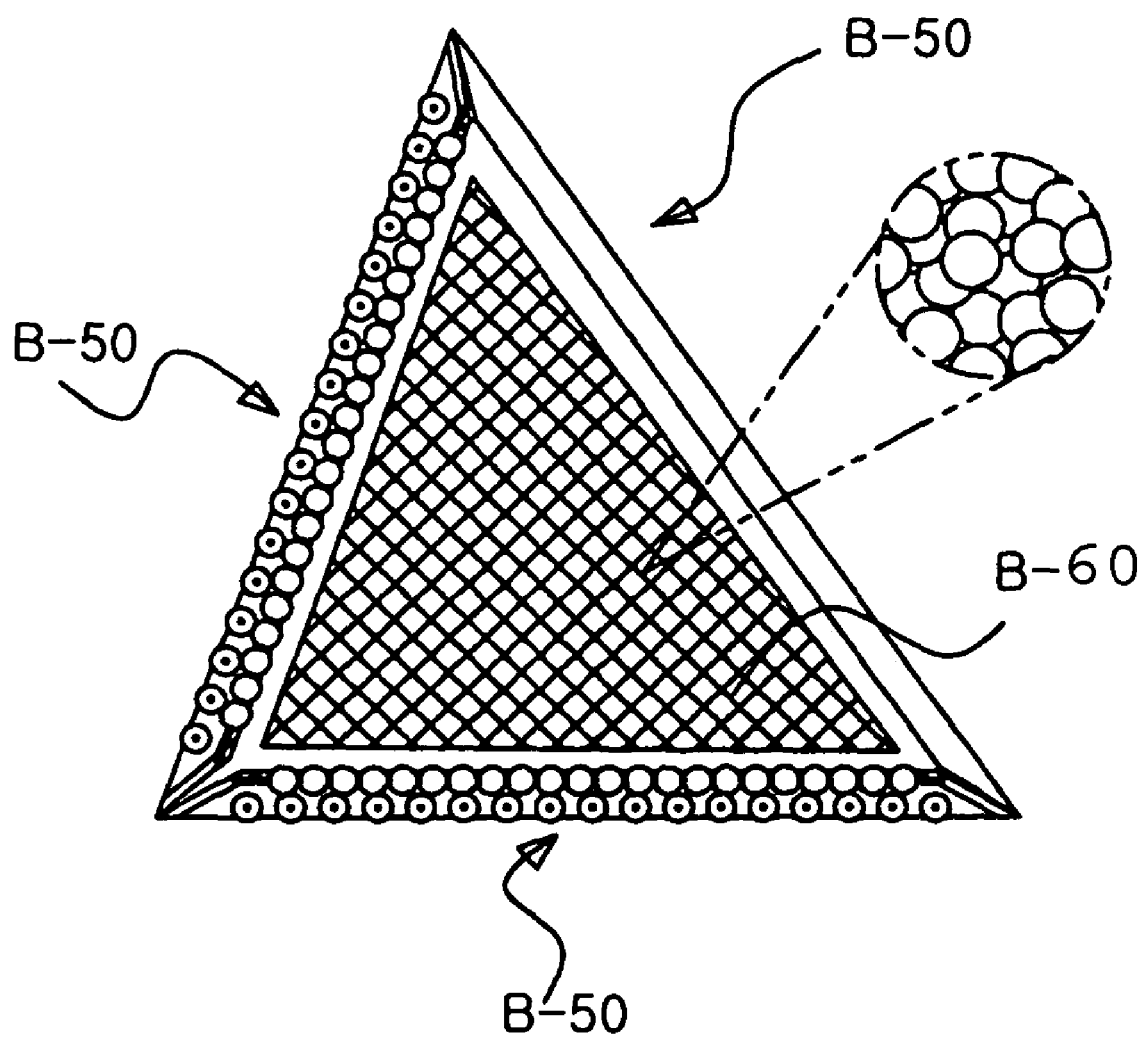
[Fig. 19]

[Fig. 20]
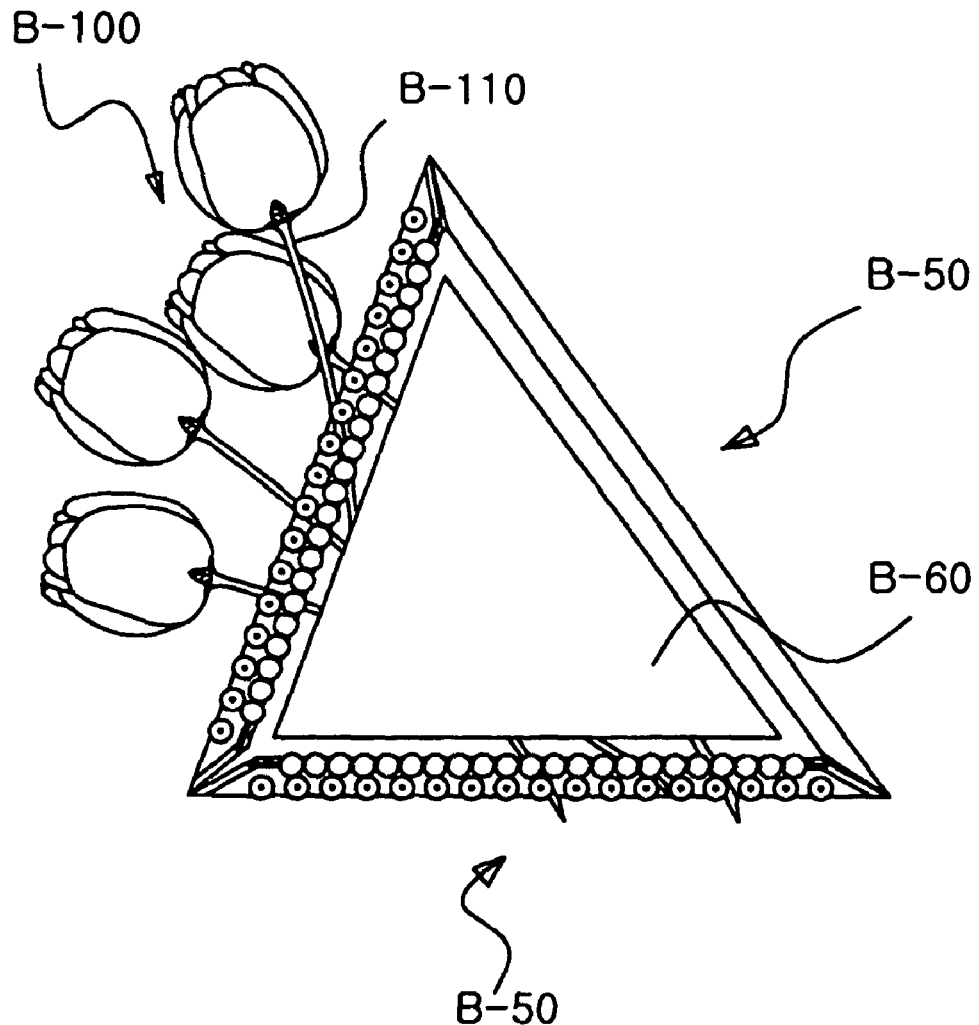
[Fig. 21]
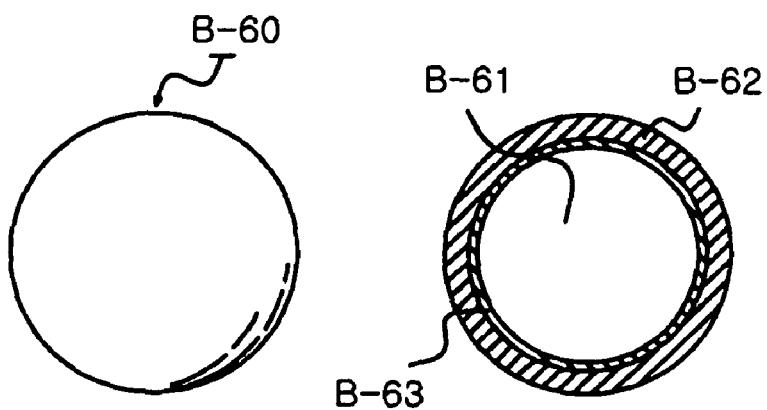

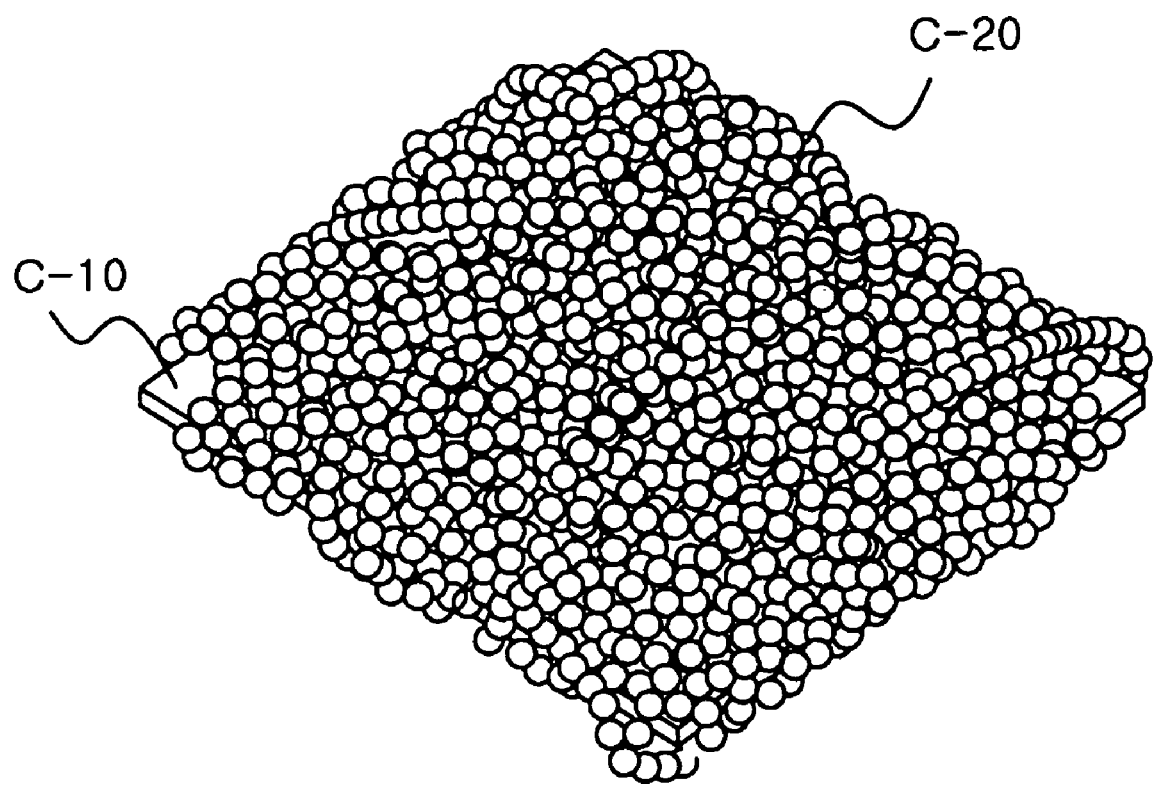
[Fig. 22]

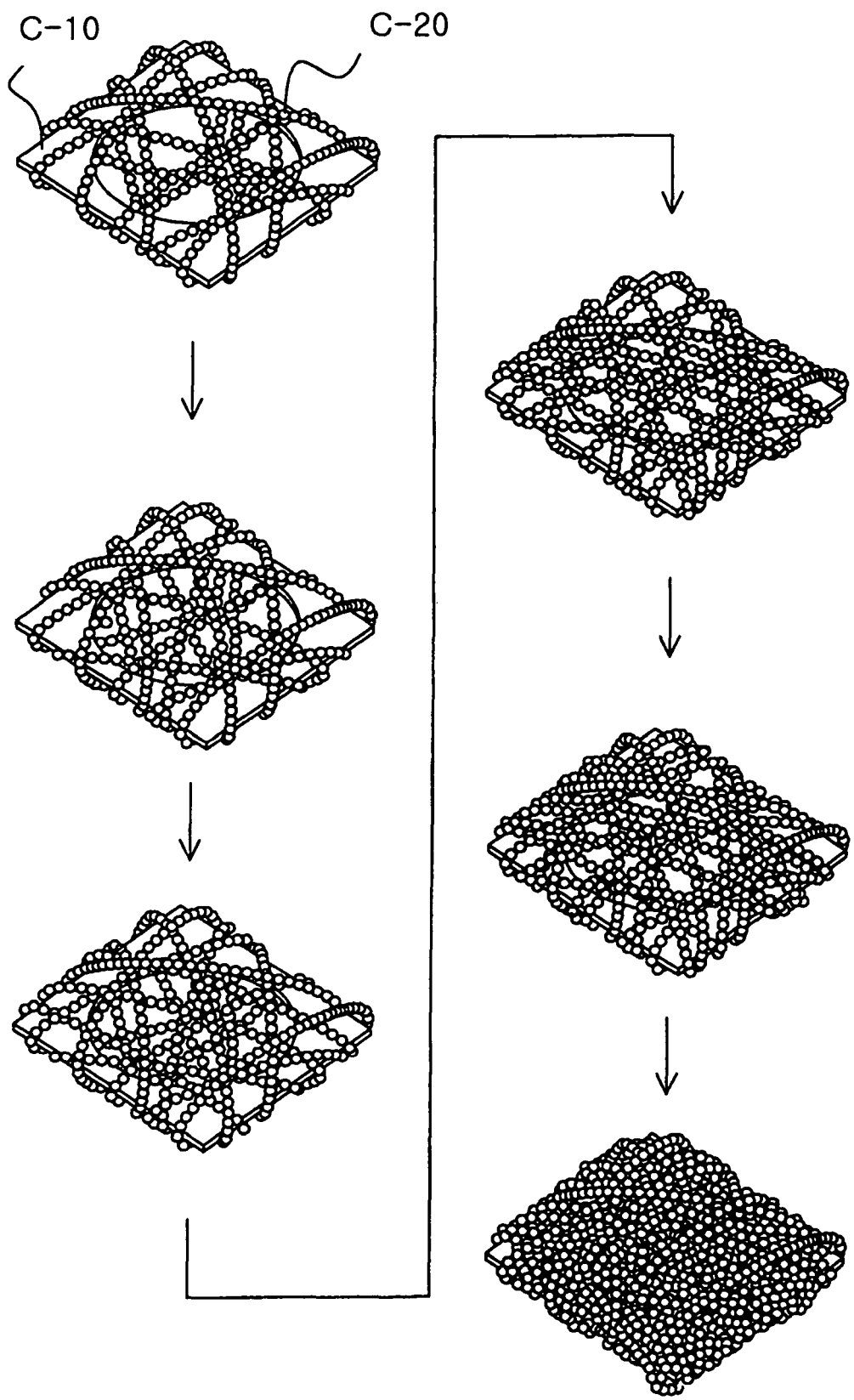
[Fig. 23]

[Fig. 24]
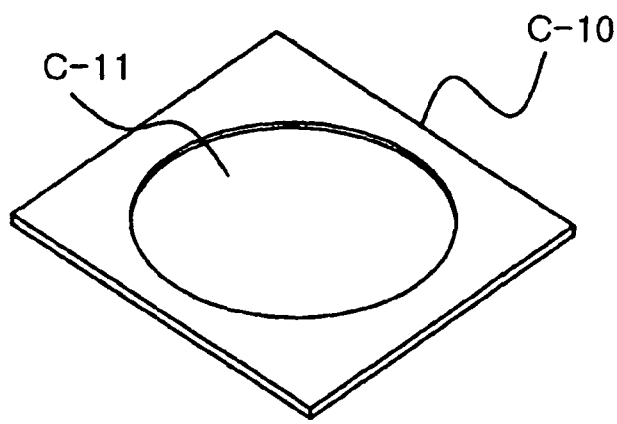
[Fig. 25]
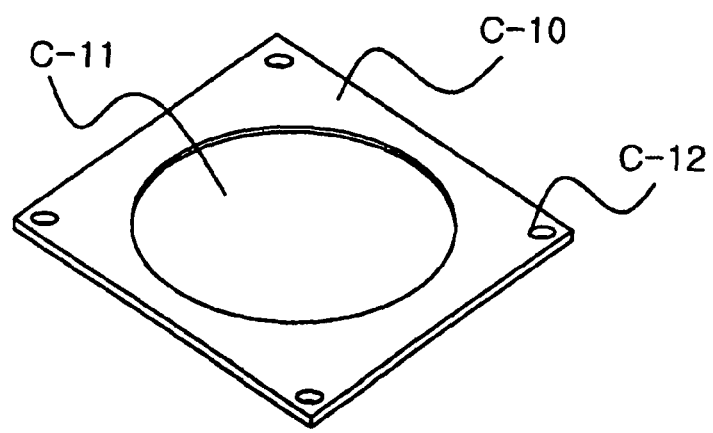
[Fig. 26]
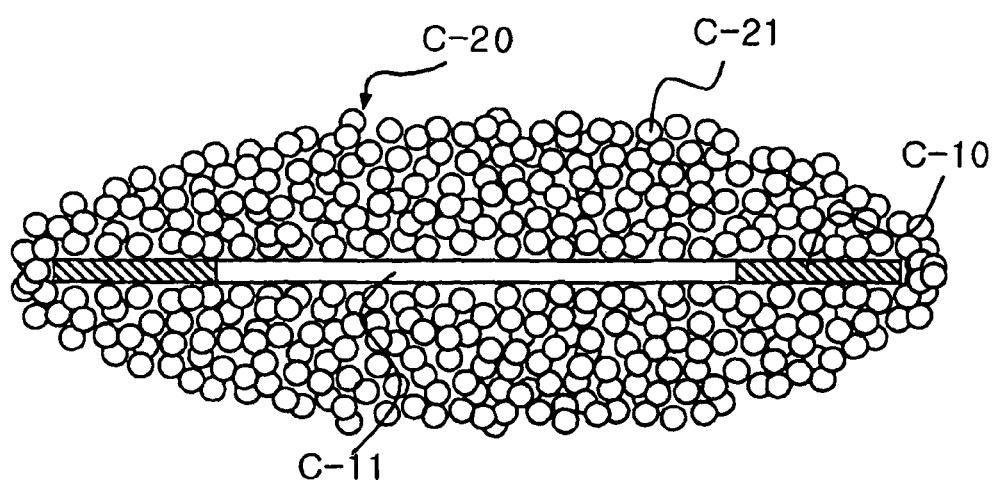

[Fig. 27]
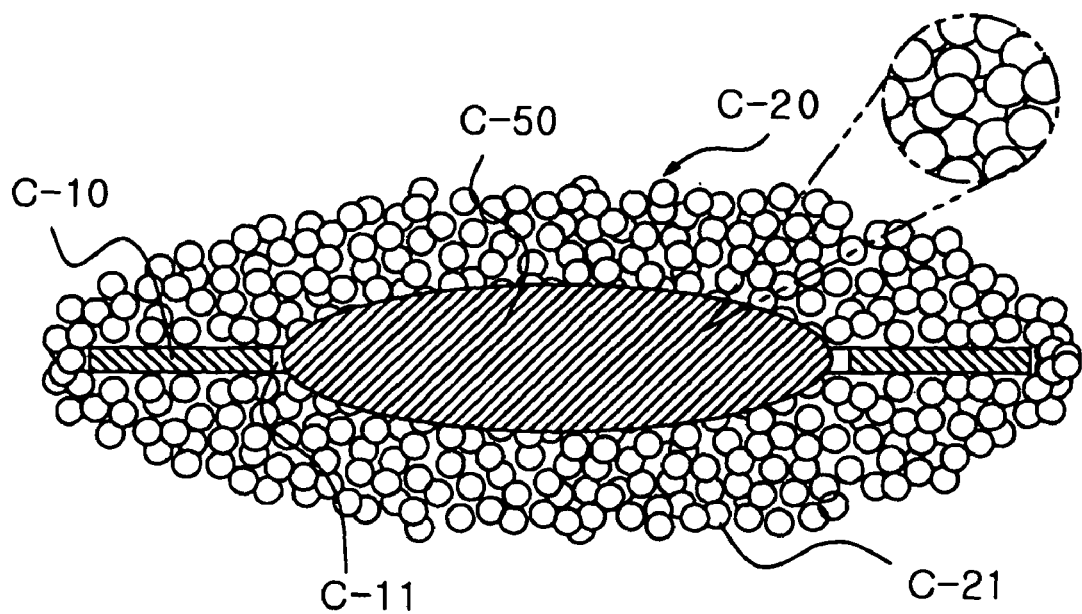
[Fig. 28]
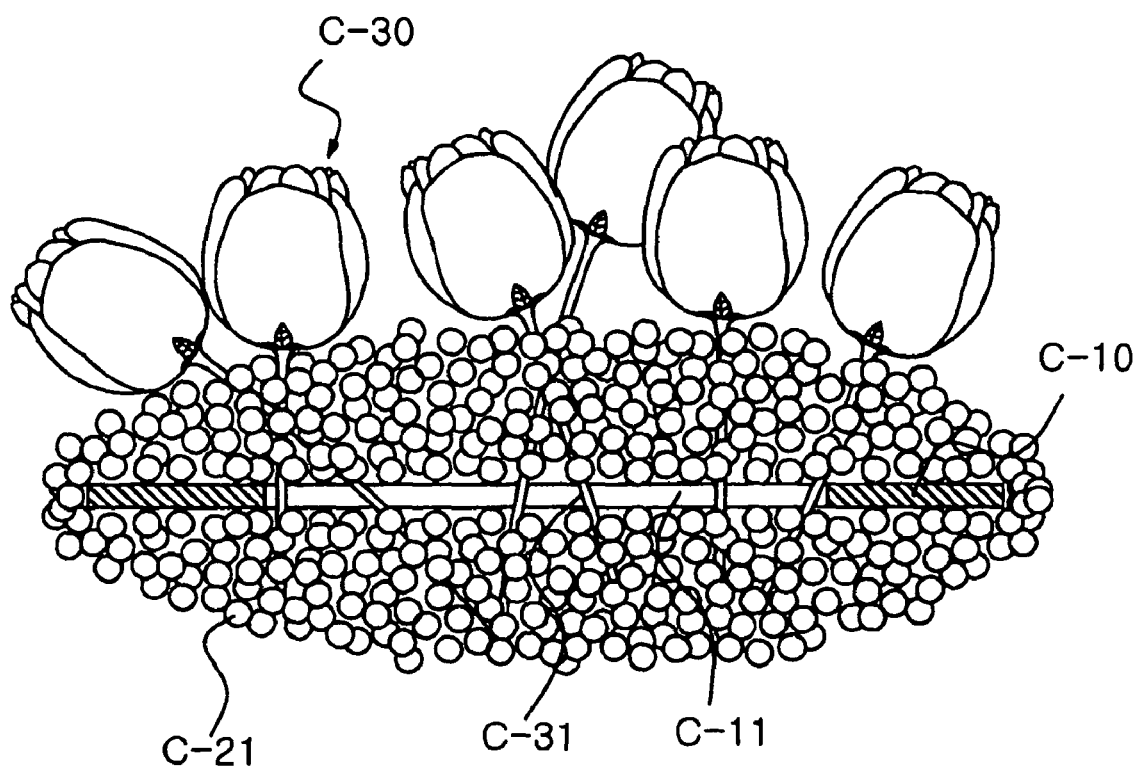

[Fig. 29]
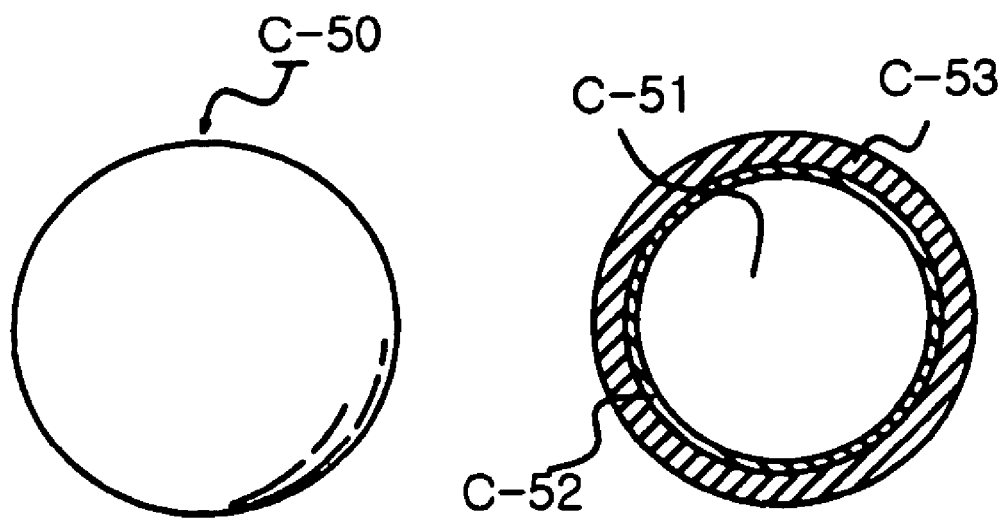
[Fig. 30]
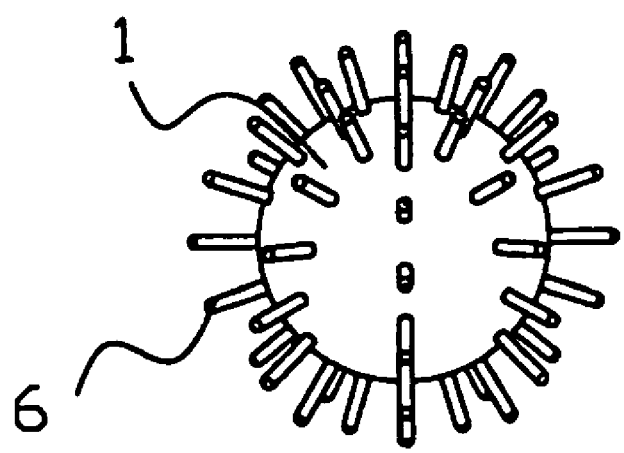

[Fig. 31]
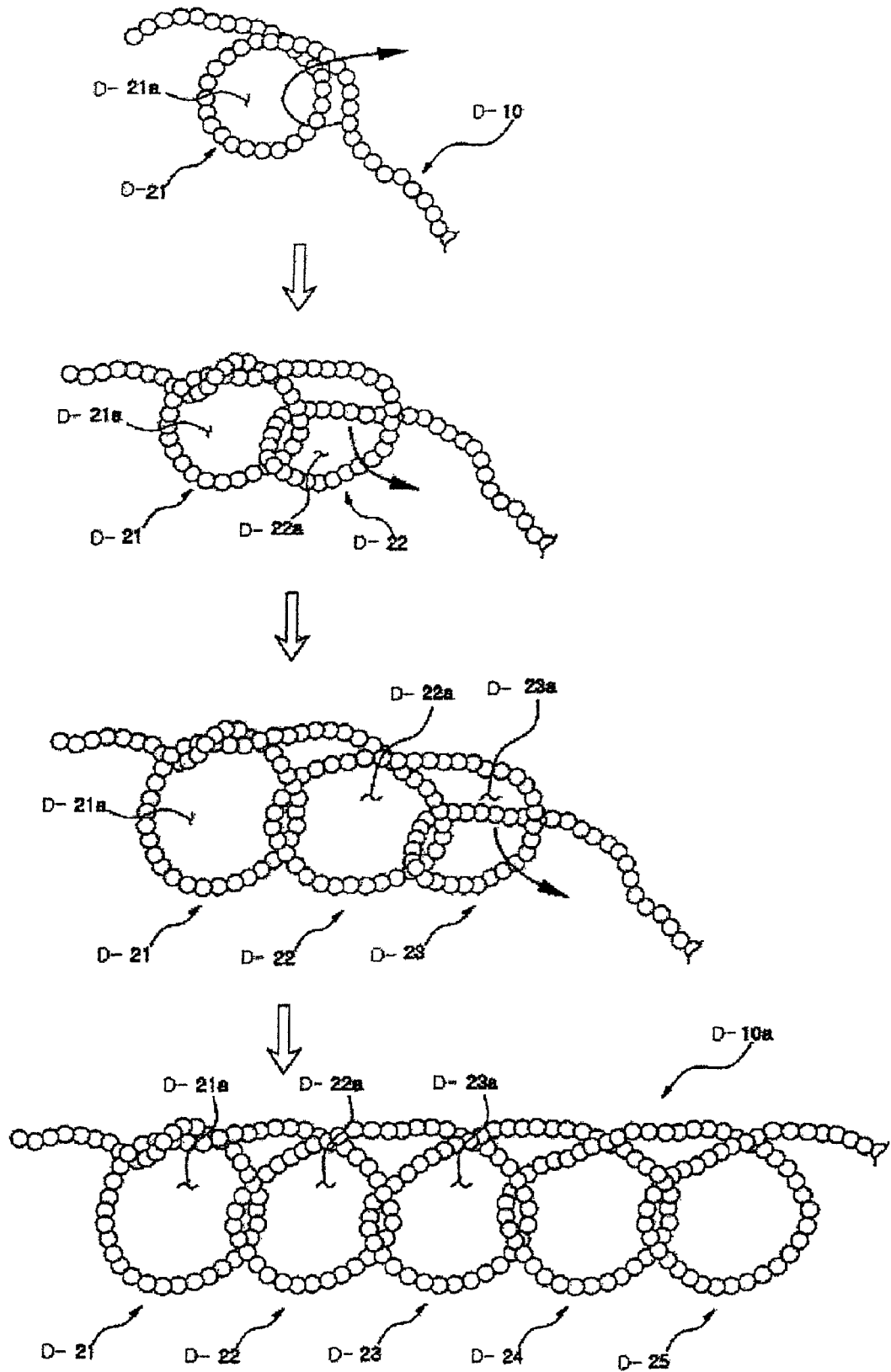

[Fig. 32]
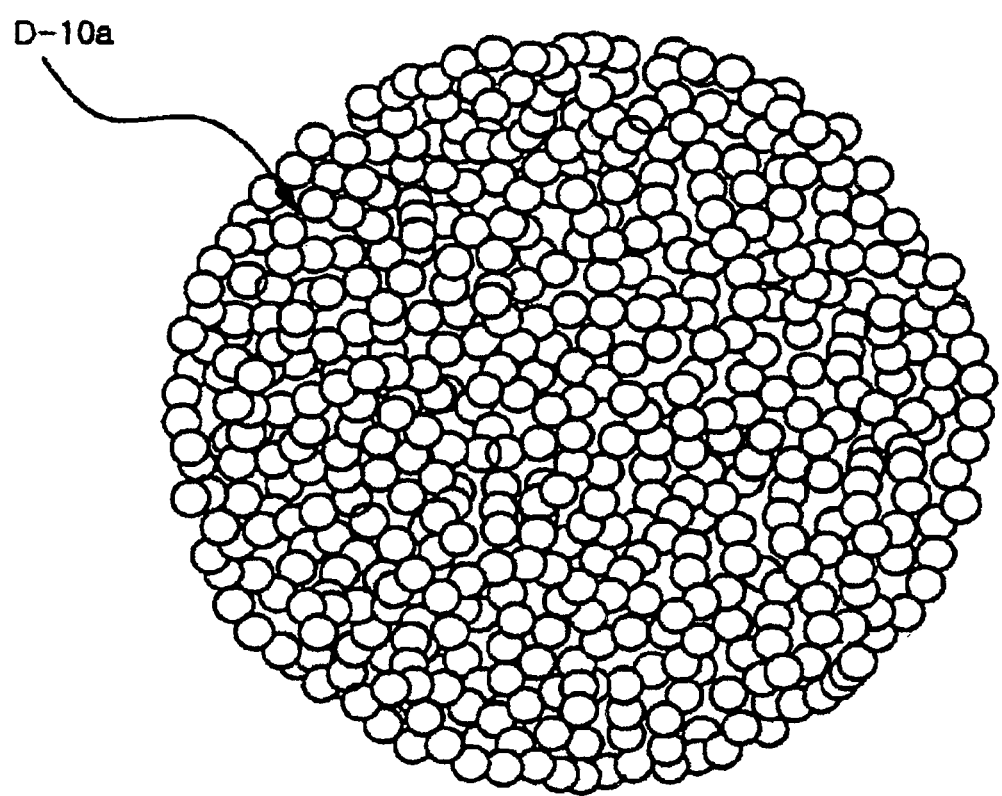

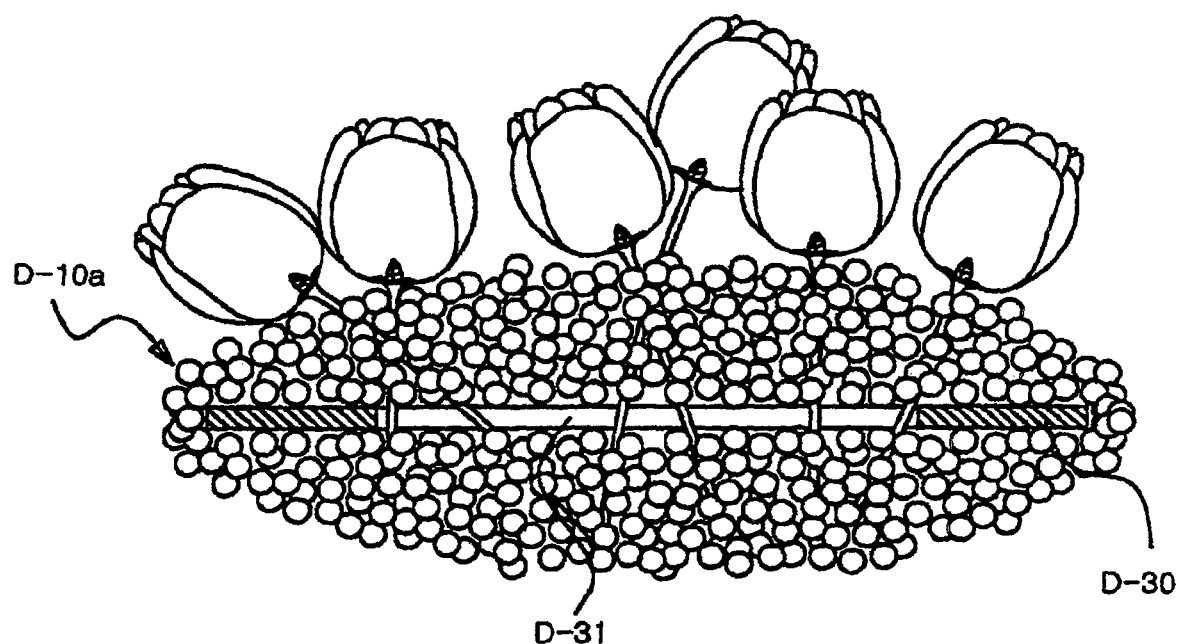
[Fig. 33]

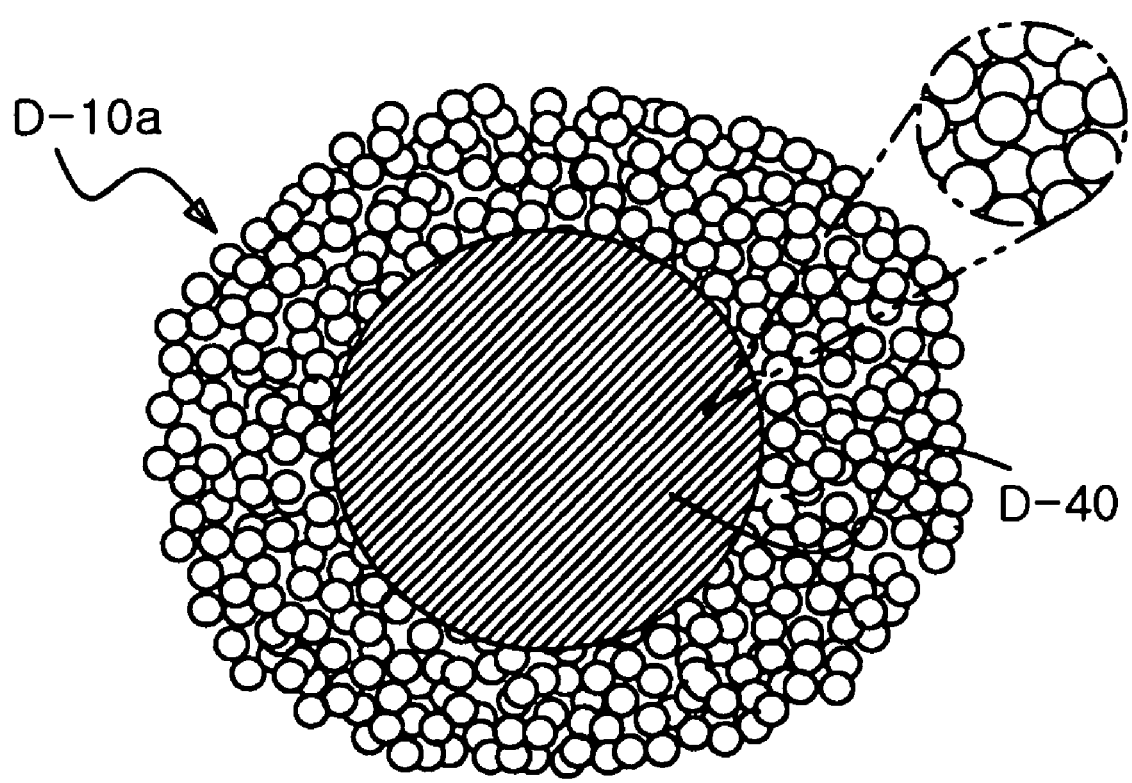
[Fig. 34]

FLOWER SUPPORTING DEVICE

TECHNICAL FIELD

The present invention relates, in general, to a flower supporting device and, more particularly, to a flower supporting device wherein the stems of flowers are supported by a plurality of rotatable beads so that the flowers can be inserted and fixedly supported among the rotatable beads at desired angles while obviating the need for separate fixing means.

BACKGROUND ART

Generally, a flower arrangement is the art of arranging cut flowers with the use of a frog in a flower basin or with the use of a floral foam (so called "Oasis") in a basket, in a variety of forms, so as to decorate the surroundings more beautifully. The flower arrangements are frequently used in ceremonies for congratulations and condolences, e.g. a wedding ceremony, an opening ceremony, a graduation ceremony, a celebration ceremony, events, parties, etc. Specially, in modern society where aesthetic consciousness is esteemed and pursued owing to the development of civilization, a job of florist has emerged as a promising category of occupations, who specializes in arranging flowers adaptively to use of the flower arrangement and directing them in a beautiful manner, to thereby increase the value added of flowers at the final consumption stage thereof.

To meet the needs of consumers and reflect the trend of the times as described above, various methods for flower arrangements have been researched and developed by florists. As a result, a variety of flower arranging devices enabling the florist to fix and arrange the flowers to the angels as desired have been researched and developed.

DISCLOSURE OF INVENTION

Technical Problem

However, a means of fixing the stem of a lower having been used for a conventional flower arrangement is designed so that a lower end of the stem is simply fixed onto a frog or a floral foam whereby the lower end of the stem is only fixed by the inserting force. Where an abnormal state (e.g., damage) has occurred to the lower end of the stem, the stem cannot be positioned in a fixed manner. In this case, even though the florist concerned is very competent, she or he would have difficulty in arranging the flowers attractively as desired.

In addition, since only the lower end of the stem is fixed the position of the stem, if long, may not be fixed, may be swayed or bent because of weak support thereof or outdoor environments, such as wind and the like.

In a case of floral foam the lower end of the stem is inserted thereonto without damage. However, in a case of a frog, since the lower end of the stem is pierced thereonto, it is liable to be hurt, and thereby, the life span of the flower may be shortened.

Where flowers are put in a flower base having no fixing means such as a frog or floral foam the flowers are positioned irregularly around the mouth of the base according to the stems different in length, where the number of flowers put in the base are not sufficient, thereby causing difficulty in directing them attractively as desired.

Moreover, conventional flower arranging devices have been manufactured and used depending upon their uses, for example, flower arrangements for table decoration, wall decoration, flower wreath, etc. These devices have formed with a plurality of holes according to required angles (angles of flowers being arranged), or such materials as floral foam are inserted into a frame having a specific type, on which the lower ends of the stems are only fixed. That is, depending upon their uses, separate flower arranging devices are required. This causes the problems of increasing production costs and consumer purchase costs, thereby increasing an economical burden to the users.

For decoration of a flat table, flowers are arranged in a flower basin wherein the stems are inserted onto the frog. Because of this, the lower ends of the stems are damaged and the life spans thereof are shortened. In addition, there may be a problem in safety because the florist is liable to be hurt by the frog while she or he is arranging the flowers thereonto.

In a wall decoration using a specific form of frame inside of which a floral foam is installed, considering the characteristics of the wall decoration, the lower ends of the stems are inserted into and supported by the floral foam installed inside, but the support force is weak and it may also be affected naturally by outdoor environment, thereby causing the aesthetic consciousness to be damaged. In order to avoid such a problem, a plurality of holes may be formed on the frame in which the floral foam is built. In this case, the flowers are only allowed for arrangement through the holes, thereby representing no desired beauty. Further, there is a limit in the number of flowers that can be used for decoration.

In a case of wreath decoration, a new frame is needed whenever a new wreath is decorated, thereby consuming a longer time in producing it and having a difficulty in reclamation of sources. Since the flowers whose stems are fixed onto the floral foam are located in the center of the wreath, it should be careful to carry it. If not, this may cause the wreath to be damaged and the form thereof to be altered in an easy manner.

Technical Solution

Accordingly, the present invention has been made keeping in mind the above problems occurring in the prior art, and an object of the present invention is to provide a flower supporting device which is constructed to freely support the stem of a flower to thereby render aesthetic appearance, reduce damage to the stem of the flower to thereby lengthen a lifetime of the stem of the flower, and be capable of supporting the flower irrespective of a length of the stem of the flower.

Another object of the present invention is to provide a flower supporting device which allows flower arrangement to be implemented in all directions to thereby render aesthetic appearance in all directions, is not limited by an installation place to permit a flower to be arranged at a desired angle, and provides a cubic effect to a flower arrangement to further improve the aesthetic appearance.

Still another object of the present invention is to provide a flower supporting device which is used to decorate a table, a wall tapestry, a mobile and a wreath, and allows an arrangement angle of a flower to be freely adjusted thereby greatly improving aesthetic appearance of a flower arrangement.

In order to achieve the above objects, according to one aspect of the present invention, there is provided a flower supporting device, wherein a plurality of rotatable beads are connected by connection means having elasticity so that a support body is formed and a plurality of support bodies are arranged to be staggered up and down with each other so that a stem of a flower can be inserted between adjoining supporting bodies to be supported by them.

According to another aspect of the present invention, there is provided a flower supporting device, wherein a plurality of rotatable beads are connected by connection means having elasticity so that a support body is formed a plurality of support bodies are installed on a frame parallel to one another so that a support section is formed and a plurality of support sections are installed in a support housing so that their respective support body arrangements are staggered one with another.

According to another aspect of the present invention, the frame is defined with a plurality of locking grooves extending downward each locking groove is defined in a projecting rod which is formed on a lower surface of the frame to project downward and each of a plurality of projecting rods has an upper support rod portion which is defined with the locking groove and a lower insertion rod portion which has the same axis and diameter as the locking groove, with a shoulder portion formed at a boundary region between the upper support rod portion and the lower insertion rod portion.

According to another aspect of the present invention, there is provided a flower supporting device, wherein a plurality of rotatable beads are connected by connection means having elasticity so that a support body is formed, and the support body is wound multitude of times on a support frame which has a predetermined configuration and is defined with an insertion hole so that a stem of a flower can be inserted through a space defined between portions of the support body and through the insertion hole of the support frame.

According to another aspect of the present invention, the support body is wound on the support frame so that the portions of the support body are staggered one with another.

According to another aspect of the present invention, there is provided a flower supporting device, wherein a plurality of rotatable beads are connected by connection means having elasticity so that a support body is formed, a plurality of support bodies are installed on a frame parallel to one another so that a support section composed of upper and lower support body layers which are staggered with each other is formed, and a plurality of support sections are connected one with another so that a three-dimensional configuration is formed.

According to another aspect of the present invention, the upper and lower support body layers are installed on the frame multitude of times in such a way as to be staggered with each other.

According to another aspect of the present invention, a water containing segment is further installed in the flower supporting device.

According to another aspect of the present invention, the water containing segment comprises a water and shock absorbing material which is composed of a plurality of small-sized spherical balls.

According to another aspect of the present invention, the water containing segment has a closed space defined therein, and the space is filled with air.

According to another aspect of the present invention, a water and shock absorbing material is further installed on an outer surface of each rotatable bead of the flower supporting device.

According to another aspect of the present invention, a plurality of flexible projections each having elasticity are formed on an outer surface of each rotatable bead of the flower supporting device.

According to another aspect of the present invention, there is provided a flower supporting device, wherein a plurality of rotatable beads are connected to each other so that a support body is formed, the support body is arranged to form a knot support having a plurality of knots, and the knot support is arranged to form a multi-layered support structure, so that a stem of a flower is inserted into each of the knots or into a space defined between the knots of the knot support arranged to provide the multi-layered support structure.

According to another aspect of the present invention, the knots of the knot support includes a basic knot provided by knotting the support body having the plurality of rotatable beads, thus defining a basic space in the basic knot, and a plurality of consecutive knots provided by repeatedly executing a process of making a first consecutive knot, which is provided by inserting a remaining part of the support body into the basic space of the basic knot to define a first consecutive space in the first consecutive knot, and a second consecutive knot which is provided by inserting a remaining part of the support body into the first consecutive space to define a second consecutive space in the second consecutive knot.

DESCRIPTION OF DRAWINGS

The above and other objects, features and other advantages of the present invention will be more clearly understood from the following detailed description when taken in conjunction with the accompanying drawings, in which:

FIG. 1 illustrates a structure of a support body which is used in a flower supporting device, according to an embodiment of the present invention;

FIG. 2 illustrates a variation of a rotatable bead according to the present invention, which constitutes the support body;

FIG. 3 is a sectional view illustrating a sectional shape of another rotatable bead according to the present invention, which constitutes the support body;

FIG. 4 is a partially-enlarged exploded perspective view illustrating the entire construction of a flower supporting device, according to a first embodiment of the present invention;

FIG. 5 is a partial enlarged view illustrating an inner structure of the flower supporting device according to the first embodiment of the present invention, shown in FIG. 4;

FIG. 6 is a partially-enlarged exploded perspective view illustrating the entire construction of a flower supporting device, according to a second embodiment of the present invention;

FIG. 7 is a view illustrating a support section of the flower supporting device according to the second embodiment of the present invention, shown in FIG. 6;

FIG. 8 is a partial sectional view illustrating an assembled state of the support section of the flower supporting device according to the second embodiment of the present invention, shown in FIG. 6;

FIG. 9 is a partial enlarged view illustrating a corner part of another support section of the flower supporting device according to the second embodiment of the present invention, shown in FIG. 6;

FIG. 10 is a partially-enlarged exploded perspective view illustrating the entire construction of a flower supporting device, according to a third embodiment of the present invention;

FIG. 11 is a partial sectional view illustrating an assembled state of the flower supporting device according to the third embodiment of the present invention, shown in FIG. 10;

FIG. 12 is a front view illustrating a state wherein flowers are arranged in the flower supporting device according to the third embodiment of the present invention, shown in FIG. 10;

FIG. 13 illustrates a structure of a water containing segment which is used in the flower supporting device according to the third embodiment of the present invention;

FIG. 14 is a partially-enlarged exploded perspective view illustrating the entire construction of a flower supporting device, according to a fourth embodiment of the present invention;

FIG. 15 is a partially-enlarged exploded perspective view illustrating another application example of the flower supporting device in accordance with the fourth embodiment of the present invention;

FIG. 16 is a view partially illustrating a support section of the flower supporting device according to the fourth embodiment of the present invention;

FIG. 17 is a view illustrating an inner structure of the flower supporting device according to the fourth embodiment of the present invention;

FIG. 18 is a view illustrating an inner structure of the flower supporting device according to the fourth embodiment of the present invention, which has a water containing segment;

FIG. 19 is a view illustrating another inner structure of the flower supporting device according to the fourth embodiment of the present invention, which has a water containing segment;

FIG. 20 is a view illustrating an in-use state of the flower supporting device according to the fourth embodiment of the present invention;

FIG. 21 illustrates a structure of the water containing segment which is used in the flower supporting device according to the fourth embodiment of the present invention;

FIG. 22 is a perspective view illustrating the entire construction of a flower supporting device, according to a fifth embodiment of the present invention;

FIG. 23 illustrates a forming procedure of the flower supporting device according to the fifth embodiment of the present invention;

FIG. 24 is a perspective view illustrating a support frame of the flower supporting device according to the fifth embodiment of the present invention;

FIG. 25 is a perspective view illustrating another support frame of the flower supporting device according to the fifth embodiment of the present invention;

FIG. 26 is a sectional view illustrating an inner structure of the flower supporting device according to the fifth embodiment of the present invention;

FIG. 27 is a sectional view illustrating another inner structure of the flower supporting device according to the fifth embodiment of the present invention;

FIG. 28 is a view illustrating an in-use state of the flower supporting device according to the fifth embodiment of the present invention;

FIG. 29 illustrates a structure of the water containing segment which is used in the flower supporting device according to the fifth embodiment of the present invention;

FIG. 30 is a front view illustrating still another rotatable bead according to the present invention, which constitutes the support body and is formed with a plurality of projections;

FIG. 31 is a perspective view showing a method of making a knot support with a plurality of knots which is used in a flower supporting device, according to a sixth embodiment of the present invention;

FIG. 32 is a view showing an example of the flower supporting device made of the knot support of FIG. 31;

FIG. 33 is a view showing another example of the flower supporting device made of the knot support of FIG. 31, in which a support frame is provided; and FIG. 34 is a view showing still another example of the flower supporting device made of the knot support FIG. 31, in which a water containing unit is provided.

BEST MODE

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a structure of a support body which is used in a flower supporting device in accordance with an embodiment of the present invention; FIG. 2 illustrates a variation of a rotatable bead according to the present invention, which constitutes the support body; and FIG. 3 is a sectional view illustrating a sectional shape of another rotatable bead according to the present invention, which constitutes the support body. In the present invention, in order to achieve the aforementioned objects, a flower supporting device comprises a support body. The support body has a plurality of rotatable beads 1 each of which is to come into contact with the stem of a flower and has a hole 2 extending therethrough, and connection means 3 which is inserted through holes 2 of the rotatable beads 1 to connect the rotatable beads 1 one with another. In the present invention, a plurality of support bodies are arranged in upward, downward leftward and rightward directions so that they are staggered one with another. The stem of a flower can be inserted between two adjoining support bodies to be supported by them.

The hole 2 of each rotatable bead 1 is defined to extend through a center of the rotatable bead 1. The rotatable beads 1 can be rotated about the connection means 3 which is fitted through the holes 2 of the rotatable beads 1. To this end, a diameter of the connection means 3 inserted through the holes 2 is determined to be less than that of the holes 2.

Also, as can be readily seen from FIG. 2, a water and shock absorbing material 4 can be further installed or coated on an outer surface of the rotatable bead 1. The water and shock absorbing material 4 may comprise floral foam sponge, non-woven fabric, urethane foam, cotton, and the like, which has a plurality of pores to be capable of absorbing water and shock.

Further, as can be readily seen from FIG. 3, the rotatable bead 1 may comprise a rubber ball-shaped element having a hole 2 through which the connection means 3 is inserted and a closed space 5 which is filled with air. A water and shock absorbing material 4 can be installed on an outer surface of the rubber ball-shaped element. The water and shock absorbing material 4 may comprise floral foam, sponge, non-woven fabric, urethane foam cotton, or the like, which has a plurality of pores to be capable of absorbing water and shock.

Moreover, as shown in FIG. 30, the rotatable bead 1 may be formed on the outer surface thereof with a plurality of flexible projections 6 which has a predetermined elasticity. The projections 6 are to come into contact with the stem of an inserted flower. When the stem of a flower is inserted between two adjoining support bodies, the projection 6 functions to fill and eliminate a space existing between two adjoining rotatable beads 1. Therefore, it is possible to prevent a space enlargement phenomenon in which the space existing between two adjoining rotatable beads 1 is widened due to the insertion of the stem of a flower.

The connection means 3 also has elasticity. The connection means 3 may comprise an integrated type connector such as fiber, synthetic fiber, synthetic resin, optical fiber, fishing line, and the like, or an assembled type connector such as a chain, and the like.

The support body of the present invention, constructed as mentioned above, can be installed in a state wherein it is cut to have a predetermined length to thereby be in conformity with a size of a support housing to be employed. Alternatively, the support body can be installed in a state wherein it has a substantial length and is wound on a support base.

The present invention can be modified in a variety of ways, and several modifications of the present invention will be described hereafter with reference to preferred embodiments.

First Embodiment

FIG. 4 is a partially-enlarged exploded perspective view illustrating the entire construction of a flower supporting device in accordance with a first embodiment of the present invention; and FIG. 5 is a partial enlarged view illustrating an inner structure of the flower supporting device according to the first embodiment of the present invention. A flower supporting device in accordance with a first embodiment of the present invention comprises first and second supporting sections A-10 and A-20 each having a plurality of rotatable beads A-11 and A-21, a support housing A-30 in which the first and second supporting sections A-10 and A-20 are received and a water containing segment A-40 which is also received in the support housing A-30 to be positioned below the first and second supporting sections A-10 and A-20.

The first support section A-10 has the plurality of rotatable beads A-11, connection means A-12 which connect the rotatable beads A-11 while having elasticity, and a frame A-13 to which the connection means A-12 are fastened. At this time, the rotatable beads A-11 and the connection means A-12 of the first embodiment respectively have the same constructions as those of the rotatable beads 1 and the connection means 3 of the support body shown in FIGS. 1 through 3. In other words, in the first support section A-10, rotatable beads A-11 are continuously connected, one with another, by each connection means A-12 to form a support body, and a plurality of support bodies are parallel arranged while they are spaced apart one from another by a predetermined interval. Both ends of each connection means A-12 which is inserted through holes defined in the rotatable beads are fastened to the frame A-13.

Each rotatable bead A-11 has a diameter of 0.3~2 cm to support the inserted stem of a flower while not causing damage to the inserted stem. Two adjoining support bodies which have their respective connection means A-12 are installed to be spaced apart from each other by the predetermined interval which is 0.5~1.5 times a diameter of the stem of the flower.

The second support section A-20 has the same construction as the first support section A-10. The second support section A-20 is received in the support housing A-30 while being rotated by 90° from an installation direction of the first support section A-10, so that a first support body arrangement of the first support section A-10 and a second support body arrangement of the second support section A-20 are staggered, that is, crossed with each other when viewed on a plane.

The support housing A-30 supports the first and second support sections A-10 and A-20. The water containing segment A-40 is also received in the support housing A-30. The support housing A-30 has the same sectional contour as the frames A-13 and A-23 of the first and second support sections. Engaging protrusions A-31 for supporting corner portions of the first and second support sections A-10 and A-20 are formed on an inner surface of the support housing A-30 while they are separated from each other by a predetermined distance.

The water containing segment A-40 is brought into contact with a lower end of the stem A-51 of the flower, and is made of a water and shock absorbing material such as floral foam, sponge, cotton, and the like, which can contain water. The water containing segment A-40 may comprise an integral piece of sheet or a combination in which a plurality of small-sized balls formed of floral foam or sponge are collectively accommodated in an appropriate manner. It is preferred that the water containing segment A-40 comprises the combination in which a plurality of small-sized balls formed of floral foam or sponge are collectively accommodated in an appropriate manner. At this time, the water containing segment comprising the combination may have a meshed net (not shown) for preventing the small-sized balls formed of floral foam or sponge from being released. In consideration of the insertion/fixing force and a water content of the stem of the flower, it is preferable to use the floral foam or sponge balls each having a diameter of 0.3~2 cm.

Due to the above-described material characteristics of the water containing segment A-40 having the small-sized spherical balls, the water containing segment can be partially and elastically deformed in its shape, the stem of the flower can be easily inserted into the water containing segment.

Also, as can be readily seen from FIG. 13, the water containing segment A-40 may have rubber ball-shaped elements A-43 each of which has a closed space A-41 which is filled with air. A water and shock absorbing material A-42 is attached to or coated on an outer surface of each rubber ball-shaped element A-43. The water and shock absorbing material A-42 may comprise floral foam, sponge, cotton, or the like.

In the flower supporting device according to the first embodiment of the present invention, constructed as mentioned above, as can be readily seen from FIG. 5, the first and second support sections A-10 and A-20 are received in the support housing A-30 so that the first support body arrangement of the first support section A-10 and the second support body arrangement of the second support section A-20 are staggered with each other. When inserting the flower A-50 in the flower supporting device, the stem A-51 of the flower is inserted through the support body arrangements of the first and second support sections A-10 and A-20. By this fact, the stem A-51 of the flower can be supported by the support body arrangements of the first and second support sections A-10 and A-20 which are installed to be staggered with each other. Concretely speaking, a first portion of the stem of the flower is supported at both sides thereof by the support body arrangement of the first support section A-10, and a second portion of the stem of the flower which is not brought into contact with the support body arrangement of the first support section A-10 is supported at both sides thereof by the support body arrangement of the second support section A-20 (at a position where the second portion is rotated by 90° from the first portion). When observing the first and second support sections A-10 and A-20 on a plane, the stem of the flower is inserted through substantially quadrangular spaces, that is, gaps which are defined between rotatable beads of the first and second support sections.

Due to the fact that the rotatable beads A-11 can be freely rotated about the connection means A-12, upon insertion of the stem of the flower, the rotatable beads A-11 which acme into contact with the stem of the flower are rotated in a moving direction of the stem to thereby ease the insertion of the stem. At this time, since the rotatable beads have a spherical configuration, the stem of the flower which comes into contact with the rotatable beads is not damaged at all.

In the present invention, the rotatable beads, connection means, support housing support section may be made of various materials such as a transparent material, an opaque material having appropriate colors, metal, wood synthetic fiber, resin, etc., which have a desired hardness.

Second Embodiment

FIG. 6 is a partially-enlarged exploded perspective view illustrating the entire construction of a flower supporting device in accordance with a second embodiment of the present invention; FIG. 7 is a view illustrating a support section of the flower supporting device according to the second embodiment of the present invention, shown in FIG. 6; FIG. 8 is a partial sectional view illustrating an assembled state of the support section of the flower supporting device according to the second embodiment of the present invention, shown in FIG. 6; and FIG. 9 is a partial enlarged view illustrating a corner part of another support section of the flower supporting device according to the second embodiment of the present invention, shown in FIG. 6. A flower supporting device in accordance with a second embodiment of the present invention comprises a support housing A-30a having a configuration in which an outer surface thereof is tapered the water containing segment A-40 which is received in the support housing A-30a, and an integral support section A-60 which is also received in the support housing A-30a to be positioned on the water containing segment A-40.

In the integral support section A-60, a plurality of support bodies each comprising connections means A-12 and rotatable beads A-1 are arranged to form two layers including upper and lower layers. The upper and lower support body arrangements are formed to be staggered with each other. That is to say, in the integral support section A-60, the first and second support sections A-10 and A-20 are integrated with each other. As shown in FIG. 7, in the integral support section A-60, upper and lower support body arrangements A-61 and A-62 are disposed in a single frame A-63 in a manner such that they are spaced part from each other by an appropriate distance.

Also, in the integral support section A-60, a fixing tab A-64 made of an elastic material is installed on a side of the frame A-63. The fixing tab A-64 functions to prevent the integral support section A-60 from being turned over when the integral support section A-60 is inserted into the support housing A-30a. The fixing tab A-64 is formed to surround the side of the frame A-63 and partially extend downward beyond a lower end of the side of the frame A-63. Namely, an outer wall of the fixing tab A-64 has a length which is greater than a height of the frame A-63. When the integral support section A-60 is inserted into the support housing A-30a, the outer wall of the fixing tab A-64 is brought into contact with an inner surface of the support housing A-30a to firmly support the integral support section A-60.

Also, as shown in FIG. 9, the fixing tab A-64 may be installed on each corner of the frame A-63 to support the integral support section A-60 which is inserted into the support housing A-30a. In this case where the fixing tab A-64 is installed on each corner of the frame A-63, it is not necessary for the fixing tab A-64 to partially extend downward beyond the lower end of the frame A-63.

As best shown in FIG. 8, the integral support section A-60 may have a configuration in which two frames A-63a and A-63b are coupled with each other. In this case, the coupling configuration has an upper frame A-63a in which the upper support body arrangement is positioned and a lower frame A-63b in which the lower support body arrangement is positioned.

A corner portion of the upper frame A-63a is defined with a locking groove A-631a which extends downward. The locking groove A-631a is defined in a projecting rod A-632a which is formed on a lower surface of the corner portion of the upper frame A-63a to extend downward. The projecting rod A-632a has an upper support rod portion A-633a which is defined with the locking groove A-631a and a lower insertion rod portion A-634a which is inserted into a locking groove A-631b of the lower frame A-63b. The lower insertion rod portion A-634a is integrally formed at a lower end of the upper support rod portion A-633a (while having a diameter which is different from that of the upper support rod portion A-633a). The upper support rod portion A-633a has a diameter which is greater than that of the lower insertion rod portion A-634a. It is not needed that the projecting rod A-632a has a cylindrical shape and rather, may have a quadrangular or polygonal sectional shape. It is to be noted that the lower insertion rod portion A-634a and the locking groove A-631a of the projecting rod A-632a have the same diameter. The upper and lower frames A-63a and A-63b are constructed in the same manner except that a projecting rod A-632b of the lower frame A-63b does not have a lower insertion rod portion.

In the flower supporting device according to the second embodiment of the present invention, constructed as mentioned above, if a flower is inserted into the flower supporting device, a middle portion of the stem of the flower can be supported by the upper and lower support body arrangements which are disposed to be staggered with each other.

Third Embodiment

FIG. 10 is a partially-enlarged exploded perspective view illustrating the entire construction of a flower supporting device in accordance with a third embodiment of the present invention; and FIG. 11 is a partial sectional view illustrating an assembled state of the flower supporting device according to the third embodiment of the present invention, shown in FIG. 10. A flower supporting device in accordance with a third embodiment of the present invention comprises a first support section A-10a in which support bodies each for supporting the plurality of rotatable beads A-11 are installed a second support section A-20a which has the same structure as the first support section A-10a and is coupled to a lower end of the first support section A-10a, a main support frame A-70 which is placed coupled to a lower end of the second support section A-20a, and the water containing segment A-40 which is installed in the main support frame A-70 and positioned below the second support section A-20a.

The first support section A-10a comprises the support bodies each of which is composed of the plurality of rotatable beads A-11 and the connection means A-12 for connecting the rotatable beads A-11, and a frame A-13a to which the connection means A-12 are fastened. The rotatable beads A-11, connection means A-12 and the frame A-13a are structured to have the same connection relationship as the first and second support sections A-10 and A-20 of FIG. 4.

As in the case of the locking groove A-631a and the projecting rod A-632a of the second embodiment, a corner portion of the frame A-13a is defined with a locking groove A-131a which extends downward. The locking groove A-131a is defined in a projecting rod A-132a which is formed on a lower surface of the corner portion of the frame A-13a to extend downward. The projecting rod A-132a has an upper support rod portion A-133a which is defined with the locking groove A-131a and a lower insertion rod portion A-134a which is inserted into a locking groove A-231a of a frame A-23a of the second support section A-20a. The lower insertion rod portion A-134a is integrally formed at a lower end of the upper support rod portion A-133a (while having a diameter which is not equal to that of the upper support rod portion A-133a). The upper support rod portion A-133a has a diameter which is greater than that of the lower insertion rod portion A-134a. It is not needed that the projecting rod A-132a has a cylindrical shape and rather, may have a quadrangular or polygonal sectional shape.

The second support section A-20a has the same construction as the first support section A-10a. In other words, the second support section A-20a is coupled to the first support section A-10a so that a rotatable bead arrangement of the second support section A-20a is staggered with that of the first support section A-10a while being rotated by 90° from an installation direction of the first support section A-10a. Hence, the first and second support sections A-10a and A-20a are coupled with each other in a manner such that the lower insertion rod portion A-134a of the projecting rod A-132a of the first support section A-10a is inserted into the locking groove A-231a of the second support section A-20a.

The main support frame A-70 is locked to the first and second support sections A-10a and A-20a which are coupled with each other, to support them. The main support frame A-70 is formed at corner portions thereof with locking rods A-71 which have substantially the same configuration as the projecting rods A-132a and A-232a of the first and second support sections. Each locking rod A-71 is defined at an upper end thereof with a locking groove A-72 which is the same as the locking grooves A-131a and A-231a of the first and second support sections. A sub frame A-73 in which the water containing segment A-40 is inserted is formed on a center portion of the main support frame A-70.

The water containing segment A-40 is brought into contact with a lower end of the stem of the flower, and is made of floral foam sponge, cotton, etc. The water containing segment A-40 may comprise an integral piece of sheet or a combination in which a plurality of small-sized balls formed of floral foam or sponge are collectively accommodated in an appropriate manner. It is preferred that the water containing segment A-40 comprises the combination in which a plurality of small-sized balls formed of floral foam sponge, cotton, etc., or a plurality of balls filled with air and having attached to an outer surface thereof a water and shock absorbing material such as floral foam and sponge are collectively accommodated in an appropriate manner. At this time, the water containing segment comprising the combination may have a meshed net for preventing the small-sized spherical balls formed of floral foam or sponge from being released.

That is to say, when the main support frame A-70 is not provided with the sub frame A-73, the water containing segment A-40 comprising the combination in which the balls formed of floral foam or sponge are collectively accommodated can be placed on the main support frame A-70. Also it is possible to use the main support frame while obviating the need for the meshed net, in a state wherein the balls formed of floral foam or sponge and the balls filled with air and having installed on the outer surface thereof floral foam or sponge are accommodated in the main support frame A-70.

FIG. 12 is a front view illustrating a state wherein flowers are arranged in the flower supporting device according to the third embodiment of the present invention, shown in FIG. 10. When it is necessary to arrange flowers using the flower supporting device according to the third embodiment of the present invention, in which the support body arrangements are installed up and down to be staggered with each other, by pushing downward the stem of a flower between two adjoining support bodies of the first support section, the stem is inserted through a space defined between the two adjoining support bodies of the first support section while rotating rotatable beads. Then, after passing through the space, the stem comes into contact with the lower support body arrangement. By continuously moving the stem of the flower downward the stem of the flower is inserted through a space defined between two adjoining support bodies of the second support section while rotating rotatable beads of the lower support body arrangement. Thereafter, a distal end of the stem of the flower is inserted into the water containing segment which is positioned in the sub frame.

The distal end of the stem of the flower inserted into the water containing segment in this way is secured with respect to the water containing segment. Therefore, since a middle portion of the stem is fixedly held by the support bodies which are disposed to be staggered with each other, it is possible to arrange the stems of flowers to a desired style. In the present invention, depending upon a length of the stem of the flower which is to be supported or as occasion demands, a plurality of the first and second support sections can be used in a state wherein they are connected one with another.

Also, in the present invention, the rotatable beads can be installed on the respective first and second support body arrangements which are disposed to be staggered with each other, in a manner such that an angle of 10~90° is measured between the rotatable bead arrangements of the first and second support sections. In the case that the rotatable bead arrangements of the first and second support sections has the angle of 10~90°, instead of the two support sections, a plurality of support sections can be employed to be operatively connected one with another, so that a plurality of support bodies are brought into contact with the stem to effectively support the flowers.

Further, in the present invention, in the case that the balls which are filled with air and have installed or coated on the outer surfaces thereof floral foam or sponge are used to constitute the water containing segment, when water is supplied into the water containing segment, as the floral foam or sponge attached to the outer surfaces of the balls draws the water, the balls float to the surface of the water by buoyancy. Namely, by the presence of the balls which float to the surface of the water, evaporation of the water supplied into the sub frame, in which the water containing segment is received is prevented. Accordingly, it is possible to supply water to the stem of the flower for extended periods. Moreover, due to the water absorbed into the outer surfaces of the balls, water can be simultaneously supplied to the stem of the flower. At this time, the rubber ball-shaped elements can support the stem of the flower, irrespective of an amount of supplied water, which is inserted between two adjoining ball elements, with the aid of the water and shock absorbing material.

Also, when the water containing segment according to the present invention is inserted into a flower vase which has the same volume as the main frame or the sub frame installed on the main frame, the water containing segment can contain water due to the presence of the water and shock absorbing material. Therefore, the inserted stem is supported by the plurality of balls each containing water. Also, because a separate layer composed of the water containing balls is formed evaporation of the water, and it is possible to supply water to the stem of the flower for extended periods.

Fourth Embodiment

FIG. 14 is a partially-enlarged exploded perspective view illustrating the entire construction of a flower supporting device in accordance with a fourth embodiment of the present invention; FIG. 15 is a partially-enlarged exploded perspective view illustrating another application example of the flower supporting device in accordance with the fourth embodiment of the present invention; and FIG. 17 is a view illustrating an inner structure of the flower supporting device according to the fourth embodiment of the present invention. A flower supporting device in accordance with a fourth embodiment of the present invention comprises a plurality of triangular support sections B-50 which are connected or coupled to one another to define a three-dimensional configuration such as a trigonal pyramid. In each triangular support section B-50, support bodies each of which is composed of connection means B-40 and a plurality of rotatable beads B-10 are disposed to form upper and lower layers which are parallel to each other and spaced apart from each other by an appropriate distance. At this time, each of the support bodies of the fourth embodiment has the same construction as that of the support body shown in FIGS. 1 through 3.

That is to say, the triangular support section B-50 has support bodies which are installed in a parallel fashion on a triangular frame B-51 to be spaced apart one from another by a predetermined interval to thereby form each of the upper and lower layers. As described above, in each support body, the rotatable beads B-10 are connected by the connection means B-40.

At this time, the upper and lower support body layers B-20 and B-30 are installed on the triangular frame B-51 in a manner such that the support bodies constituting the upper support body layer B-20 which is disposed outward in the drawing and the support bodies constituting the lower support body layer B-30 which is disposed inward in the drawing are staggered with each other. It is preferred that the upper and lower support body layers B-20 and B-30 are disposed to be staggered with each other so that an intervening angle of 90° is defined between them. Of course, in the present invention, a plurality of upper and lower support body layers can be repeatedly installed, and, in this case, depending upon the number of the upper and lower support body layers which are repeatedly installed, an intervening angle between two adjoining support body layers can be appropriately changed. For example, in the case that an upwardly positioned support body layer and a downwardly positioned support body layer are installed to be staggered with each other to thereby define an intervening angle of 45°, the stem of the flower can be supported on eight parts by four support body layers. Thus, in the present invention, if the support bodies are installed to define a plurality of support body layers, by changing an intervening angle measured between the support bodies of two adjoining support body layers, it is possible to securely support the stem of the flower.

The rotatable bead B-10 has a diameter of 0.3~1.5 cm so as to support and the stem of the flower and not to cause damage to the stem of the flower. Two adjoining support bodies are arranged to be spaced apart from each other by a predetermined interval which is 0.5~1.5 times a diameter of the stem of the flower.

In the present embodiment of the present invention, triangular support sections each constructed as mentioned above are assembled one with another to define a three-dimensional configuration such as a trigonal pyramid etc. The assembly of the triangular support sections is implemented using the conventional assembling means, that is, through insertion of a projecting bracket or by an adhesive.

When a flower is arranged on the flower supporting device according to this embodiment of the present invention constructed as mentioned above, if the stem of a flower to be inserted through a surface of the trigonal pyramid has a substantial length, after the stem of the flower is inserted through the surface of the trigonal pyramid, depending upon a length thereof the stem can project to the outside out of another surface of the trigonal pyramid. At this time, since the connection means for connecting the rotatable beads one with another has a predetermined elasticity, a space through which the stem of the flower can passes is secured when the stem of the flower is inserted. Because the stem of the flower passes through the two surfaces of the trigonal pyramid the flower can be securely supported by the two surfaces of the trigonal pyramid.

Further, due to the fact that the connection means passes through the holes defined in the rotatable beads, the rotatable beads can be rotated about the connection means. Thus, when the stem of the flower is inserted into the flower supporting device of the present invention, as the rotatable beads are brought into contact with the stem of the flower, the rotatable beads are rotated about the connection means. Therefore, due to the rotation of the rotatable beads, the insertion of the stem of the flower can be easily implemented and damage to the stem of the flower is greatly reduced. Moreover, since the water and shock absorbing material which is defined with a plurality of pores is installed on the outer surface of each rotatable bead, water contained in the pores of the water and shock absorbing material can be transferred to the stem of the flower due to the contact between the stem of the flower and the water and shock absorbing material.

In the case that a flower having a short length is inserted into a surface of the trigonal pyramid, because the two support body layers are installed to be staggered with each other in the triangular support section which constitutes one surface of the trigonal pyramid, the stem of the flower is fixed by the support bodies arranged to define two layers. That is to say, while the two support body layers are installed parallel to each other to define therebetween an intervening angle of 90°, both sides of a portion of the stem are supported by the upper support body layer, and both sides of another portion of the stem are supported by the lower support body layer. As a result, the stem of the flower can be supported at four parts by the support bodies.

FIG. 18 is a view illustrating an inner structure of the flower supporting device according to the fourth embodiment of the present invention, which has a water containing segment; and FIG. 19 is a view illustrating another inner structure of the flower supporting device according to the fourth embodiment of the present invention, which has a water containing segment. The flower supporting device according to this embodiment of the present invention can be provided with a water containing segment B-60 which is capable of containing water.

The water containing segment B-60 comes into contact with a lower end or a middle portion of the stem of a flower to supply water to the flower. The water containing segment B-60 comprises a combination in which a plurality of small-sized balls formed of a water and shock absorbing material capable of containing water, such as floral foam or sponge, are collectively accommodated in an appropriate manner. The water containing segment comprising the combination may have a meshed net (not shown) for preventing the small-sized balls formed of floral foam or sponge from being released. Also, in consideration of the insertion/fixing force and a water content of the stem of the flower, it is preferable to use the floral foam or sponge balls each having a diameter of 0.3~2 cm.

Further, as can be readily seen from FIG. 21, the water containing segment B-60 may have rubber ball-shaped elements B-63 each of which can be elastically deformed in its shape and has a closed space B-61 which is filled with air. A water and shock absorbing material B-62 can be attached to or coated on an outer surface of each rubber ball-shaped element B-63. The water and shock absorbing material B-62 may comprise sponge, urethane foam, floral foam, or the like.

FIG. 20 is a view illustrating an in-use state of the flower supporting device according to the fourth embodiment of the present invention. As described above, in the case that a flower B-100 is arranged on the flower supporting device according to this embodiment of the present invention, having installed therein the water containing segment B-60, if the stem B-110 of the flower is pushed downward toward a surface of the trigonal pyramid, the stem B-110 of the flower B-100 is inserted into the inside of the trigonal pyramid through the upper and lower support body layers which constitute one surface of the trigonal pyramid. Thereafter, a distal end of the stem is inserted into a space defined among the balls formed of floral foam or sponge, which constitute the water containing segment B-60 which is positioned inward of the surface of the trigonal pyramid. In the case that the stem of the flower has a substantial length, after the stem of the flower is inserted through the surface of the trigonal pyramid, the stem can project to the outside out of another surface of the trigonal pyramid. Therefore, as the stem of the flower having passed through one surface of the trigonal pyramid, the water containing segment and another surface of the trigonal pyramid is securely supported primarily by the upper and lower support body layers which are installed to be staggered with each other and constitute one surface of the trigonal pyramid, secondarily by the balls formed of floral foam or sponge, and finally by the upper and lower support body layers which are installed to be staggered with each other and constitute another surface of the trigonal pyramid. That is to say, the stem of the flower is supported at three parts thereon. In the case that the stem of a flower has a short length, the stem can be securely supported by the balls formed of floral foam or sponge which constitute the water containing segment and are positioned inside the trigonal pyramid, and/or by the upper and lower support body layers which are installed to be staggered with each other to constitute one surface of the trigonal pyramid.

Besides, in the present invention, as shown in FIG. 15, it is possible to form a quadrangular pyramid-shaped configuration in a manner such that sides of the quadrangular pyramid are formed by connecting the triangular support sections one with another and a bottom of the quadrangular pyramid has a quadrangular shape rather than a triangular one. At this time, each of the surfaces which constitute the sides of the quadrangular pyramid has the same construction as the aforementioned triangular support section.

A person skilled in the art will readily recognize that this embodiment of the present invention can be modified to form various three-dimensional configurations including a trigonal pyramid a tetrahedron, etc. by using the triangular support sections. In this embodiment of the present invention, even when the flower supporting device does not have any water containing segment, by submerging the flower supporting device into water, water is supplied to the stem of the flower.

Fifth Embodiment

FIG. 22 is a perspective view illustrating the entire construction of a flower supporting device in accordance with a fifth embodiment of the present invention; and FIG. 23 illustrates a forming procedure of the flower supporting device according to the fifth embodiment of the present invention. A flower supporting device in accordance with a fifth embodiment of the present invention comprises a support frame C-10 which is defined at a center portion thereof with an insertion hole C-11, and a support body C-20 which is wound on the support frame C-10 to the extent that the insertion hole C-11 is substantially not viewed from the outside.

The support frame C-10 serves as a flower vase. As shown in FIG. 24, in order to prepare the support frame C-10, a plate having a predetermined thickness is defined at a center portion thereof with the insertion groove C-11. The insertion groove C-11 is defined to extend from an upper surface to a lower surface of the plate, that is, through the support frame C-10. At this time, a person skilled in the art will readily recognize that the support frame C-10 may have a shape of a polygon such as a triangle, quadrangle, pentagon, etc. Also it is not necessary that the insertion hole have a circular sectional shape. As shown in FIG. 25, the support frame C-10 may be defined with a plurality of engagement holes C-12 at around the insertion hole C-11. Moreover, the support frame C-10 may have not only the plate-shaped configuration but also a three-dimensional configuration such as a polyhedron, which has a plurality of insertion holes extending therethrough. In this regard, a hollow three-dimensional configuration such as a hollow polyhedron can be adopted.

The support body C-20 is brought into contact with the stem C-31 of a flower to securely support the stem C-31 of the flower. In the support body C-20, a plurality of rotatable beads C-21 are connected by connection means in the shape of an elongate band. At this time, each rotatable bead C-21 has a diameter of 0.3~1.5 cm to support the stem C-31 of the flower while not damaging the stem C-31. At this time, the rotatable beads C-21 and the connection means of the fifth embodiment respectively have the same constructions as those of the rotatable beads 1 and the connection means 3 of the support body shown in FIGS. 1 through 3.

As clearly shown in FIG. 23, the support body C-20 is installed in a manner such that it is continuously wound up and down on the support frame C-10 in a zigzagged manner and the insertion hole C-11 of the support frame is substantially not viewed from the outside. As the support body C-20 is installed zigzag about the insertion hole C-11, a middle portion of the support frame C-10 which is defined with the insertion hole C-11 is roundly shaped in the form of a thread skein. The support body C-20 is installed to form a multitude of layers. Since the support body C-20 is installed in the zigzagged manner, the connection means for connecting the rotatable beads C-21 is disposed so that portions of the connection means are staggered one with another multitude of times in diverse directions.

In other words, due to the fact that portions of the support body C-20 are staggered one with another, installation directions of the connection means are also staggered one with another. As a consequence, the rotatable beads C-21 are installed in various installation directions, and a space is defined among adjoining rotatable beads which are aligned in various directions.

FIG. 26 is a sectional view illustrating an inner structure of the flower supporting device according to the fifth embodiment of the present invention. In FIG. 26, the support body C-20 is wound on the support frame C-10 which is defined with the insertion hole C-11 in a manner such that portions of the support body C-20 are staggered one with another, by which a plurality of spaces, that is, gaps are defined in the support body C-20.

FIG. 27 is a sectional view illustrating another inner structure of the flower supporting device according to the fifth embodiment of the present invention. In FIG. 27, a water containing segment C-50 is disposed in the insertion groove C-11 of the support frame, and the support body C-20 is wound in the same manner as shown in FIG. 23 so that the water containing segment C-50 is positioned in the support body C-20. The middle portion of the support frame C-10 is shaped to be further rounded due to the presence of the water containing segment C-50. It is to be noted that, depending upon a size of the water containing segment C-50, the support body C-20 wound on the support frame may have a circular contour.

The water containing segment C-50 comes into contact with a lower end or a middle portion of the stem of a flower. The water containing segment C-50 comprises a combination in which a plurality of small-sized balls formed of floral foam or sponge are collectively accommodated in an appropriate manner. The water containing segment C-50 comprising the combination may have a meshed net for preventing the small-sized balls formed of floral foam or sponge from being released. Also in consideration of the insertion/fixing force and a water content of the stem of the flower, it is preferable to use the floral foam or sponge balls each having a diameter of 0.3~2 cm.

Further, as shown in FIG. 29, the water containing segment may have rubber ball-shaped elements C-52 each of which has a closed space B-61 filled with air. A water and shock absorbing material C-53 can be installed on an outer surface of each rubber ball-shaped element C-52. The water and shock absorbing material C-53 may comprise floral foam, sponge, or the like. Therefore, the rubber ball-shaped rotatable beads and the rubber ball-shaped elements constituting the water containing segment have similar constructions. The water containing segment and the rotatable beads are formed so that they can be freely and elastically deformed in its shape depending upon their material characteristics, whereby it is possible to prevent the stem of the flower from being damaged and easily supply water to the flower.

FIG. 28 is a view illustrating an in-use state of the flower supporting device according to the fifth embodiment of the present invention. If the distal end of the stem C-31 is inserted through a space defined in the support body C-20 which is installed to be wound on the support frame C-10 multitude of times, as the support body is brought into contact with an outer surface of the stem in a plurality of directions, the portions of the support body C-20 which are disposed to be staggered one with another support the sides of the stem C-31 at various positions to securely hold the stem C-31 in a space (a gap) defined among the rotatable beads.

At this time, because the rotatable beads C-21 are installed to be rotated about the connection means, when the stem C-31 of the flower is inserted into the support body, due to contact with the stem of the flower, the rotatable beads C-21 are rotated about the connection means in such a way as to ease the inward movement of the stem. Further, since the connection means has a predetermined elasticity, a space through which the stem of the flower can passes is secured when the stem of the flower is inserted. Because the water and shock absorbing material capable of absorbing water is further installed on the outer surface of the rotatable bead C-21, it is possible to supply water to the stem of the flower which comes into contact with the water and shock absorbing material.

Sixth Embodiment

FIG. 31 is a perspective view showing a method of making a knot support with a plurality of knots which is used in a flower supporting device, according to a sixth embodiment of the present invention; and FIG. 32 is a view showing an example of the flower supporting device made of the knot support of FIG. 31. A flower supporting device according to a sixth embodiment of the present invention includes a plurality of rotatable beads. A support body D-10 is produced by coupling the plurality of rotatable beads to each other. A knot support D-10a is produced by specifically arranging the support body D-10 to form the plurality of knots. To provide the flower supporting device, the knot support D-10a is arranged to form a predetermined support structure. Thereafter, stems of the flowers are inserted into and fastened in the knots of the knot support D-10a or spaces (gaps) defined between the knots of the knot support D-10a.

The support body D-10 executes a role of supporting the stems of the flowers while being in contact with the stems of the flowers, and has the same construction as that of the support body C-20 of the fifth embodiment.

The knot support D-10a is produced by specifically arranging the support body D-10, which has the plurality of rotatable beads and the connection means, to form the plurality of knots with the support body D-10. As shown in FIG. 31, the knots of the knot support D-10a includes a basic knot D-21 which is provided by knotting the support body D-10 to define a predetermined space in the basic knot D-21, and a first consecutive knot D-22 which is provided by inserting a remaining part of the support body D-10 into the predetermined space of the basic knot D-21 to define another space in the first consecutive knot D-22. The knots of the knot support D-10a further include a second consecutive knot D-23 which is provided by inserting a remaining part of the support body D-10 into the space of the first consecutive knot D-22, thus defining another space in the second consecutive knot D-23.

That is, to produce the knot support D-10a, the support body D-10 loosely forms the basic knot D-21, thus defining a basic space D-21a in the basic knot D-21. Thereafter, the remaining part of the support body D-10 is inserted into the basic space D-21a of the basic knot D-21, so that the first consecutive knot D-22 is formed to define therein a first consecutive space D-22a. In the above state, the remaining part of the support body D-10 is inserted into the first consecutive space D-22a of the first consecutive knot D-22, so that the second consecutive knot D-23 is formed to define therein a second consecutive space D-23a. By repeatedly executing the above-mentioned process of making the knots, third fourth and more consecutive knots 24, 25, ???, etc, are provided.

After making the knot support D-10a through the above-mentioned process, the knot support D-10a is arranged to form a support structure having a desired shape, such as a ball shape, a rugby-ball shape, a hexahedral shape and etc. Thereafter, each of both ends of the knot support D-10a is fastened to each of predetermined portions of the knot support D-10a by a coupling means, such as a pin, a rope, a clip, a tape and etc., thus preventing the knot support D-10a from being undesirably loosened.

When making the knots, the support D-10 must be loosely pulled to define a space in each of the knots. To prevent the knot support D-10a from being undesirably loosened the knot support D-10a is consecutively arranged in a zigzag pattern in which parts of the knot support D-10a cross with each other.

As such, when the parts of the knot support D-10a cross each other in the zigzag pattern, the knots of the knot support D-10a are tangled to each other, and the knot support D-10a is repeatedly overlapped on top of another part. At this time, because the plurality of knots are consecutively provided in the knot support D-10a, a plurality of spaces are defined in the knots, between knots, defined between the rotatable beads. Therefore, the flower supporting device of the present invention, which is produced by arranging the knot support D-10a into the support structure having a predetermined shape, such as the ball shape, the rugby-ball shape, the hexahedral shape and etc., has therein the plurality of spaces into which the stems of the flowers are inserted.

Furthermore, the knot support D-10a may have knots of any types to define therein predetermined spaces, without being limited to the above-mentioned knots of a chain-stitch type comprising the basic knot D-21 and the consecutive knots, as shown in FIG. 31. That is, the flower supporting device of the present invention may be produced to have knots of various types.

FIG. 32 is a view showing the example of the flower supporting device made of the knot support of FIG. 31. As shown in FIG. 32, the knot support D-10a with the plurality of knots is arranged to form a crossing-support structure. Thereafter, each of the both ends of the knot support D-10a is fastened to each of the predetermined portions of the knot support D-10a to prevent the knot support D-10a from being undesirably loosened. Thus, the predetermined spaces which are the spaces defined in the knots, or the spaces (gaps) defined between the rotatable beads are defined in the knot support D-10a having the crossing-support structure. The stems of the flowers are inserted into the predetermined spaces (gaps) of the knot support D-10a to be supported.

When the stems of flowers are inserted into the predetermined spaces of the knot support D-10a, the knot support D-10a having the crossing-support structure supports and fastens therein each of the stems of the flowers at various angles, because a plurality of portions of an outer surface of each of the stems of the flowers are in close contact with the support body D-10.

At this time, because the rotatable beads are rotatably provided around the connection means, the stems of the flowers are smoothly inserted into the flower supporting device while the stems of the flowers are in contact with the rotatable beads. Furthermore, the connection means has the predetermined elasticity, so that the stems of the flowers may be inserted into the predetermined spaces (gaps) which are elastically formed in the flower supporting device. In addition, the rotatable beads or a water and shock absorbing materials, which are provided around an outer surfaces of the rotatable beads, each have a plurality of pores. Therefore, the flower supporting device of the present invention contains therein a large amount of water, thus smoothly feeding the water to the stems of the flowers.

FIG. 33 is a view showing another example of the flower supporting device made of the knot support of FIG. 31, in which a support frame is provided. As shown in FIG. 33, the knot support D-10a of the flower supporting device according to the sixth embodiment may be used along with the support frame D-30. That is, the knot support D-10a is wound around the support frame D-30, which has therein an insert hole D-31, in a zigzag pattern in which the knot support D-10a repeatedly passes upward and downward through the insert hole D-31 without being exposed to the outside. Thus, the insert hole D-31 of the support frame D-30 is covered with the knot support D-10a. As such, the knot support D-10a is repeatedly wound around the support frame D-30 in the zigzag pattern, so that an intermediate portion of the support frame D-30 which is the portion having the insert hole D-31 is rounded with the knot support D-10a, like a skein of thread. After the knot support D-10a is provided around the support frame D-30, the stems of the flowers are supported in the knots and in the spaces defined between the knots and between the rotatable beads D-11.

FIG. 34 is a view showing further another example of the flower supporting device made of the knot support FIG. 31, in which a water containing unit is provided. To provide the flower supporting device according to the sixth embodiment of the present invention, the knot support D-10a may be wound around a water containing unit D-40. That is, the knot support D-10a is wound around the water containing unit D-40 of a floral foam or an aggregation in which a plurality of small floral foams each having a ball shape, or a plurality of sponge balls are aggregated.

In case that the water containing unit D-40 is provided in the flower supporting device, it is possible to increase a size of the flower supporting device of the present invention. Furthermore, the water containing unit D-40 receives therein an intermediate portion or a lower portion of each of the stems of the flowers, so that a sufficient amount of water can be fed to the flowers. Furthermore, the water containing unit D-40 may be provided in the insert hole D-31 of the support frame D-30.

INDUSTRIAL APPLICABILITY

As apparent from the above description, the flower supporting device according to the present invention, constructed as mentioned above, provides advantages in that, since a plurality of support bodies are arranged to be staggered one with another to thereby support the stem of a flower, it is possible to easily insert the stem of the flower between the support bodies irrespective of a length of the stem whereby flowers can be freely arranged on the flower supporting device.

Also, in the present invention, in the case that rotatable beads, connection means, support frames and support sections are formed of a transparent material or a material having desired colors, aesthetic appearance rendered when flower arrangement is implemented using the present flower supporting device can be further improved even when the number of the flowers to be arranged is decreased.

Further, in the present invention, by the fact that the rotatable beads which come into contact with the stem of the flower are installed to be rotated about the connection means, because the rotatable beads are rotated with the insertion of the stem of the flower, damage to the stem of the flower is not caused whereby it is possible to extend a lifetime of the stem and the aesthetic appearance of the flower can be rendered for lengthy periods.

Moreover, in the present invention, a water and shock absorbing material having a plurality of pores is further installed on an outer surface of each rotatable bead, water can be contained in the pores, and thereby, it is possible to supply water to the stem of the flower which comes into contact with the water and shock absorbing material.

Furthermore, in the present invention, due to the fact that a water containing segment comprises a combination of small-sized balls each capable of containing water, water can be preserved and supplied to the stem of the flower. Particularly, in the case that the balls are filled with air, since an additional covering layer capable of containing water by itself is formed on the surface of water, water can be supplied to the stem of the flower for extended periods.

In addition, because the water containing segment can contain water by itself in the case that water is supplied to the stem of the flower with the water containing segment received in a separate receptacle such as a flower vase, rolling of the water contained in the flower vase is prevented whereby it is possible to prevent water from overflowing out of the flower vase.

Besides, as shown in FIG. 30, in the case that a rotatable bead which is formed on an outer surface thereof with a plurality of flexible projections each having predetermined elasticity is used a space defined among adjoining rotatable beads is removed by the presence of the flexible projections. Consequently, when the stem of the flower is inserted into the flower supporting device, force for supporting the inserted stem of the flower can be increased.

Also, as shown in FIG. 25, since the support frame is defined with engagement holes, the flower supporting device according to the present invention can be employed to decorate a table as well as a wall tapestry, and can be installed at a center portion of a wreath to cooperate with a frame of the wreath. In the fifth embodiment of the present invention as describe above, because the support part is installed about the support frame, flowers can be arranged in both vertical directions. Therefore, it is possible to use the flower supporting device according to the present invention in a space devoid of a support surface and in various interior decorations such as in the case of a mobile which is connected to the ceiling whereby aesthetic appearance rendered by the flower supporting device according to the present invention can be further improved.

In addition, as shown in FIG. 31, in the case that a knot support is provided by arranging the support body to form a plurality of knots, and then arranged to cross in all directions, sufficient spaces are provided in the flower supporting device. Thus, a user can insert large numbers of flowers into the spaces, and fasten the flowers at desired angles regardless of directions of inserting the flowers into the flower supporting device.

Moreover, the present invention provides the flower supporting device with a simple construction, thus easily producing the flower supporting devices. Furthermore, in the flower supporting device of the present invention, knots, which serve as a means for supporting the flowers, are easily formed thus simply providing the flower supporting device, and reducing the manufacturing costs of the flower supporting device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A flower supporting device, comprising a multi-layered support structure, wherein a plurality of rotatable beads is connected by connection means having elasticity and forming a support body, the support body forming a knot support having a plurality of knots that are interlocked, wherein the knot support is wound around a water containing segment and is arranged to form the multi-layered support structure, wherein a stem of a flower is inserted into each of the knots or into a space defined between the knots of the knot support of the multi-layered support structure, wherein the knots of the knot support comprise:

a basic knot provided by knotting the support body having the plurality of rotatable beads, thus defining a basic space in the basic knot; and a plurality of consecutive knots provided by repeatedly executing a process of making a first consecutive knot, which is provided by inserting a remaining part of the support body into the basic space of the basic knot to define a first consecutive space in the first consecutive knot, and a second consecutive knot which is provided by inserting a remaining part of the support body into the first consecutive space to define a second consecutive space in the second consecutive knot, and wherein the knot support is wound so that multi-layers of the knot support are staggered one with another.

2. The device as set forth in claim 1, wherein a water and shock absorbing material is further installed on an outer surface of each rotatable bead of the flower supporting device.

3. The device as set forth in claim 1, wherein the knot support is wound a multitude of times on a support frame, which has a predetermined configuration and is defined with an insertion hole, through the insertion hole, wherein the knot support repeatedly passes upward and downward through the insertion hole.

4. The device as set forth in claim 1, wherein the water containing segment comprises a water and shock absorbing material which is composed of a plurality of small-sized spherical balls.

5. The device as set forth in claim 1, wherein the water containing segment has a closed space defined therein, and the space being filled with air.

* * * * *